US010991162B2

(12) United States Patent
Jones et al.

(10) Patent No.: US 10,991,162 B2
(45) Date of Patent: Apr. 27, 2021

(54) INTEGRATING A USER OF A HEAD-MOUNTED DISPLAY INTO A PROCESS

(71) Applicant: Curious Company, LLC, Portland, OR (US)

(72) Inventors: Anthony Mark Jones, Hillsboro, OR (US); Jessica A. F. Jones, Forest Grove, OR (US); Bruce A. Young, Le Mars, IA (US)

(*) Notice: Subject to any disclaimer, the term of this patent is extended or adjusted under 35 U.S.C. 154(b) by 0 days.

(21) Appl. No.: 16/211,061

(22) Filed: Dec. 5, 2018

(65) Prior Publication Data

US 2020/0174553 A1    Jun. 4, 2020

Related U.S. Application Data

(63) Continuation of application No. 16/208,799, filed on Dec. 4, 2018.

(51) Int. Cl.
*G06T 19/00* (2011.01)
*G06F 3/01* (2006.01)
(Continued)

(52) U.S. Cl.
CPC .......... *G06T 19/003* (2013.01); *A63F 13/285* (2014.09); *A63F 13/5375* (2014.09);
(Continued)

(58) Field of Classification Search
CPC combination set(s) only.
See application file for complete search history.

(56) References Cited

U.S. PATENT DOCUMENTS 3,861,350 A    1/1975 Selleck
5,309,169 A    5/1994 Lippert
(Continued)

FOREIGN PATENT DOCUMENTS

CN    103697900 A    4/2014
CN    105781618 A    7/2016
(Continued)

OTHER PUBLICATIONS

Polap, Dawid, et al., Obstacle Detection as a Safety Alert in Augmented Reality Models by the Use of Deep Learning Techniques, Sensors (Basil), Dec. 4, 2017.
(Continued)

*Primary Examiner* — Kwin Xie
(74) *Attorney, Agent, or Firm* — Young's Patent Services, LLC; Bruce A Young

(57) ABSTRACT

A computer system enhances guidance information on a display, allowing a user position and orientation in 3D space to be achieved. In some embodiments, the guidance is visual, for example the blurring of display objects not at the desired position. In some embodiments, the guidance is aural, for example placing a sound moving to the desired position. In some embodiments, the guidance is tactile, for example using haptic pads attached to a head-mounted display to push the user in a specified direction. The system may be used to guide the user spatially for the performing of a task, to help the user avoid sensitive components, or to guide the user to position a sensor, such as a camera, in an optimal direction for taking measurements. The system includes head positioning, hand positioning and gaze positioning techniques.

20 Claims, 12 Drawing Sheets

(51) Int. Cl.
  *G02B 27/01* (2006.01)
  *A63F 13/285* (2014.01)
  *A63F 13/5375* (2014.01)
(52) U.S. Cl.
  CPC ............ *G02B 27/017* (2013.01); *G06F 3/011* (2013.01); *G06F 3/016* (2013.01)

(56) References Cited

U.S. PATENT DOCUMENTS

| | | |
|---|---|---|
| 5,815,411 A | 9/1998 | Ellenby et al. |
| 8,520,900 B2 | 8/2013 | Rhoads et al. |
| 8,863,039 B2 | 10/2014 | Lim et al. |
| 8,953,841 B1 | 2/2015 | Leblang et al. |
| 9,165,381 B2 | 10/2015 | Latta et al. |
| 9,229,231 B2 | 1/2016 | Small et al. |
| 9,292,096 B2 | 3/2016 | Watanabe et al. |
| 9,852,599 B1 | 12/2017 | Slavin et al. |
| 9,911,020 B1 | 3/2018 | Liu et al. |
| 9,928,662 B2 | 3/2018 | Palmaro |
| 9,953,216 B2 | 4/2018 | Alvarez |
| 9,978,180 B2 | 5/2018 | Margolis et al. |
| 10,065,074 B1 | 9/2018 | Hoang et al. |
| 10,134,192 B2 | 11/2018 | Tomlin et al. |
| 10,203,762 B2 | 2/2019 | Bradski et al. |
| 10,430,985 B2 | 10/2019 | Harrises et al. |
| 10,497,161 B1 | 12/2019 | Jones et al. |
| 10,528,228 B2 | 1/2020 | Seixeiro et al. |
| 10,636,197 B2 | 4/2020 | Jones |
| 10,636,216 B2 | 4/2020 | Jones et al. |
| 10,650,600 B2 | 5/2020 | Jones et al. |
| 10,706,629 B2 | 7/2020 | Boyapalle et al. |
| 10,803,668 B2 | 10/2020 | Jones et al. |
| 10,818,088 B2 | 10/2020 | Jones et al. |
| 10,861,239 B2 | 12/2020 | Jones et al. |
| 10,872,584 B2 | 12/2020 | Jones et al. |
| 10,901,218 B2 | 1/2021 | Jones et al. |
| 10,955,674 | 3/2021 | Jones et al. |
| 2002/0191004 A1 | 12/2002 | Ebersole |
| 2002/0196202 A1 | 12/2002 | Bastian et al. |
| 2003/0025714 A1 | 2/2003 | Ebersole et al. |
| 2003/0210812 A1 | 11/2003 | Khamene et al. |
| 2005/0041424 A1 | 2/2005 | Ducharme |
| 2007/0045641 A1 | 3/2007 | Chua et al. |
| 2008/0267490 A1 | 10/2008 | Gorges et al. |
| 2008/0300854 A1 | 12/2008 | Eibye |
| 2009/0065715 A1 | 3/2009 | Wainright |
| 2009/0091237 A1 | 4/2009 | Hirosaki et al. |
| 2009/0109244 A1 | 4/2009 | Conner et al. |
| 2009/0240431 A1 | 9/2009 | Chau et al. |
| 2009/0251537 A1 | 10/2009 | Keidar et al. |
| 2010/0117828 A1 | 5/2010 | Goldman et al. |
| 2010/0302015 A1 | 12/2010 | Kipman et al. |
| 2011/0270135 A1* | 11/2011 | Dooley ................. G16H 50/30 600/595 |
| 2012/0087104 A1 | 4/2012 | Dai et al. |
| 2012/0105473 A1 | 5/2012 | Bar-Zeev et al. |
| 2012/0206452 A1 | 8/2012 | Geisner et al. |
| 2012/0249741 A1 | 10/2012 | Maciocci et al. |
| 2012/0289290 A1 | 11/2012 | Chae et al. |
| 2013/0073637 A1 | 3/2013 | Kim |
| 2013/0222371 A1 | 8/2013 | Reitan |
| 2013/0249947 A1 | 9/2013 | Reitan |
| 2013/0249948 A1 | 9/2013 | Reitan |
| 2013/0342564 A1 | 12/2013 | Kinnebrew et al. |
| 2014/0002444 A1 | 1/2014 | Bennett et al. |
| 2014/0184496 A1 | 7/2014 | Gribetz et al. |
| 2014/0306891 A1 | 10/2014 | Latta et al. |
| 2015/0109193 A1 | 4/2015 | Sly et al. |
| 2015/0130790 A1 | 5/2015 | Vasquez et al. |
| 2015/0243079 A1 | 8/2015 | Cho et al. |
| 2015/0263806 A1 | 9/2015 | Puscasu et al. |
| 2015/0278604 A1 | 10/2015 | Shuster et al. |
| 2015/0293592 A1* | 10/2015 | Cheong ................. G06F 3/016 345/173 |
| 2015/0325047 A1 | 11/2015 | Conner et al. |
| 2016/0003737 A1 | 1/2016 | Shimada |
| 2016/0026219 A1* | 1/2016 | Kim ...................... G06F 1/1652 345/173 |
| 2016/0026253 A1 | 1/2016 | Bradski et al. |
| 2016/0029143 A1 | 1/2016 | Johnson et al. |
| 2016/0147408 A1 | 5/2016 | Bevis et al. |
| 2016/0187974 A1 | 6/2016 | Mallinson |
| 2016/0248506 A1 | 8/2016 | Ryan et al. |
| 2016/0270656 A1 | 9/2016 | Samec et al. |
| 2016/0342388 A1 | 11/2016 | Imamura et al. |
| 2017/0005826 A1 | 1/2017 | Youn |
| 2017/0026560 A1 | 1/2017 | Whitehouse et al. |
| 2017/0061696 A1 | 3/2017 | Li et al. |
| 2017/0091998 A1 | 3/2017 | Piccolo |
| 2017/0103440 A1 | 4/2017 | Xing et al. |
| 2017/0117823 A1 | 4/2017 | Arnaud et al. |
| 2017/0169170 A1 | 6/2017 | Otin |
| 2017/0173457 A1 | 6/2017 | Rihn |
| 2017/0192091 A1 | 7/2017 | Felix |
| 2017/0193705 A1 | 7/2017 | Mullins et al. |
| 2017/0269712 A1 | 9/2017 | Forsblom et al. |
| 2017/0277166 A1 | 9/2017 | Popa-Simil et al. |
| 2017/0277257 A1 | 9/2017 | Ota et al. |
| 2017/0301107 A1 | 10/2017 | Sasaki |
| 2017/0323483 A1* | 11/2017 | Palmaro .................. G06F 3/014 |
| 2017/0330042 A1 | 11/2017 | Vaziri |
| 2017/0330376 A1 | 11/2017 | Haseltine et al. |
| 2017/0341576 A1 | 11/2017 | Lei et al. |
| 2017/0354878 A1 | 12/2017 | Posin |
| 2017/0374486 A1 | 12/2017 | Killham et al. |
| 2018/0011676 A1 | 1/2018 | Han et al. |
| 2018/0020312 A1 | 1/2018 | Visser et al. |
| 2018/0029641 A1 | 2/2018 | Solar et al. |
| 2018/0050267 A1 | 2/2018 | Jones |
| 2018/0053130 A1 | 2/2018 | Pettersson et al. |
| 2018/0053394 A1 | 2/2018 | Gersten |
| 2018/0074599 A1 | 3/2018 | Garcia et al. |
| 2018/0107277 A1 | 4/2018 | Keller et al. |
| 2018/0120936 A1 | 5/2018 | Keller et al. |
| 2018/0239144 A1 | 8/2018 | Woods et al. |
| 2018/0239417 A1 | 8/2018 | Fu et al. |
| 2018/0246698 A1 | 8/2018 | Huang |
| 2018/0261012 A1 | 9/2018 | Mullins et al. |
| 2018/0262270 A1 | 9/2018 | Maricic et al. |
| 2018/0299272 A1 | 10/2018 | Salowitz |
| 2018/0299543 A1 | 10/2018 | Lomnitz et al. |
| 2018/0303190 A1 | 10/2018 | Calilung et al. |
| 2018/0307310 A1 | 10/2018 | Mccombe et al. |
| 2018/0350221 A1 | 12/2018 | Chabra et al. |
| 2019/0007548 A1 | 1/2019 | Sit et al. |
| 2019/0011703 A1 | 1/2019 | Robaina et al. |
| 2019/0026592 A1 | 1/2019 | Wang et al. |
| 2019/0101978 A1 | 4/2019 | Iseringhausen et al. |
| 2019/0113207 A1 | 4/2019 | Palmer et al. |
| 2019/0114921 A1 | 4/2019 | Cazzoli |
| 2019/0116448 A1* | 4/2019 | Schmidt ................. G06F 3/167 |
| 2019/0132815 A1 | 5/2019 | Zampini et al. |
| 2019/0196578 A1 | 6/2019 | Iodice et al. |
| 2019/0199136 A1 | 6/2019 | Choi et al. |
| 2019/0224572 A1* | 7/2019 | Leeper ................... G06F 3/011 |
| 2019/0271755 A1 | 9/2019 | Peitz et al. |
| 2019/0373395 A1 | 12/2019 | Sarkar |
| 2019/0377538 A1 | 12/2019 | Jones et al. |
| 2019/0385370 A1 | 12/2019 | Boyapalle et al. |
| 2020/0020145 A1 | 1/2020 | Jones et al. |
| 2020/0020161 A1 | 1/2020 | Jones et al. |
| 2020/0020162 A1 | 1/2020 | Jones et al. |
| 2020/0082600 A1 | 3/2020 | Jones et al. |
| 2020/0082601 A1 | 3/2020 | Jones et al. |
| 2020/0082602 A1 | 3/2020 | Jones |
| 2020/0082628 A1 | 3/2020 | Jones et al. |
| 2020/0150751 A1* | 5/2020 | Laaksonen .............. G06T 11/00 |
| 2020/0018363 A1 | 6/2020 | Boyapalle et al. |
| 2020/0183171 A1 | 6/2020 | Robaina et al. |
| 2020/0292817 A1 | 9/2020 | Jones et al. |
| 2020/0294314 A1 | 9/2020 | Jones et al. |
| 2020/0294472 A1 | 9/2020 | Jones et al. |

(56) References Cited

U.S. PATENT DOCUMENTS

FOREIGN PATENT DOCUMENTS

| CN | 107657662 A | 2/2018 |
|---|---|---|
| WO | 2003060830 A1 | 7/2003 |
| WO | 2017151778 A1 | 9/2017 |
| WO | 2018129051 A1 | 7/2018 |

OTHER PUBLICATIONS

USPTO, Final Office Action in related case U.S. Appl. No. 16/135,175, dated Jan. 27, 2019.
USPTO, Final Office Action in related case U.S. Appl. No. 16/135,198, dated Jan. 29, 2020.
USPTO, Final Office Action in Related Matter U.S. Appl. No. 16/135,198, dated Jan. 29, 2020.
USPTO, Final Office Action in Related Matter U.S. Appl. No. 16/123,543, dated Jan. 16, 2020.
USPTO, Final Office Action in Related Matter U.S. Appl. No. 16/135,119, dated Jan. 24, 2020.
USPTO, Non-Final Office Action in Related Matter U.S. Appl. No. 16/135,175, dated Oct. 23, 2019.
USPTO, Non-Final Office Action in Related Matter U.S. Appl. No. 16/135,198, dated Nov. 20, 2019.
USPTO, Non-Final Office Action in Related Matter U.S. Appl. No. 16/135,214, dated Dec. 19, 2019.
USPTO, Non-Final Office Action in Related Matter U.S. Appl. No. 16/007,335, dated Sep. 6, 2019.
USPTO, Non-Final Office Action in Related Matter U.S. Appl. No. 16/031,797, dated Oct. 9, 2019.
USPTO, Non-Final Office Action in Related Matter U.S. Appl. No. 16/0311,772, dated Oct. 1, 2019.
USPTO, Non-Final Office Action in Related Matter U.S. Appl. No. 16/123,543, dated Oct. 9, 2019.
USPTO, Non-Final Office Action in Related Matter U.S. Appl. No. 16/135,119, dated Oct. 17, 2019.
USPTO, Notice of Allowance for U.S. Appl. No. 16/0007,204, dated Sep. 6, 2018.
Young, Bruce, Response to non-Final Office Action in Related Matter U.S. Appl. No. 16/007,335, dated Jan. 2, 2020.
Young, Bruce, Response to non-Final Office Action in Related Matter U.S. Appl. No. 16/031,772, dated Dec. 18, 2019.
Young, Bruce, Response to non-Final Office Action in Related Matter U.S. Appl. No. 16/0331,797, dated Jan. 6, 2020.
Young, Bruce, Response to non-Final Office Action in Related Matter U.S. Appl. No. 16/123,543, dated Jan. 3, 2020.
Young, Bruce, Response to non-Final Office Action in Related Matter U.S. Appl. No. 16/135,119, dated Jan. 6, 2020.
Young, Bruce, Response to non-Final Office Action in Related Matter U.S. Appl. No. 16/135,175, dated Jan. 6, 2020.
Young, Bruce, Response to non-Final Office Action in Related Matter U.S. Appl. No. 16/135,198, dated Jan. 9, 2020.
Young, Bruce, Response to non-Final Office Action in Related Matter U.S. Appl. No. 16/135,214, dated Jan. 9, 2020.
Bjerregaard, Lindsay, Consilio3D Technologies Creates New Augmented Reality Inspection Product, Retrieved from http://www.mro-network.com/software/consilio3d-technologies-creates-new-augmented-reality-inspection-product on Jun. 20, 2018.
Daqri, Smart Glasses Specifications Sheet, Mar. 15, 2018, Retrieved from https://assets.daqri.com/documents/DAQRI_Smart_Glasses_Datasheet_2018.pdf on Aug. 22, 2019.
Daqri, Smart Glasses, Retrieved from https://www.daqri.com/products/smart-glasses/ on Jun. 20, 2018.
Epson, Moverio Pro BT-200/BT-300 Smart Headset, Retrieved from https://epson.com/For-Work/Wearables/Smart-Glasses/Moverio-Pro-BT-2000-Smart-Headset-/p/V11H725020 on Jun. 20, 2018.
Farsens, EPC C1G2 Batteryless Ambient Temperature and Barometric Pressure Sensor, Jan. 2018, retrieved from http://www.farsens.com/wp-content/uploads/2018/01/DS-EVAL01-FENIX-VORTEX-RM-V03.pdf on Nov. 30, 2018.
Farsnes, EPC C1G2 Batteryless LED Indicator, Jan. 2018, retrieved from http://www.farsens.com/wp-content/uploads/2018/01/DS-EVAL01-STELLA-R-V03.pdf on Nov. 30, 2018.
Laster Technologies, Laster SeeThru: The First Genuine Augmented Reality Wireless Eyewear Launches on Kickstarter, Retrieved from https://www.businesswire.com/news/home/20140115005387/en/LASTER-SeeThru-Genuine-Augmented-Reality-Wireless-Eyewear on Jun. 20, 2018.
Microsoft, Hololens Overview, Retrieved from https://www.microsoft.com/en-us/hololens/commercial-overview on Jun. 20, 2018.
Microsoft, Why Hololens, Retrieved from https://www.microsoft.com/en-us/hololens/why-hololens on Jun. 20, 2018.
Occulus, Rift VR Headset, Retrieved from https://www.oculus.com/rift/?utm_campaign=%5bcampaign%5d&utm_source=google&utm_medium=cpc&gclid=Cj0KCQiAzrTUBRCnARIsAL0mqcyb5MhpYgdQ1fl2hb0CxWclg32N-e8B4Vv-zBcirW136-5JU3PAQaEaAkLaEALw_wcB&gclsrc=aw.ds on Jun. 20, 2018.
Osterhout Design Group, Smartglasses 7, Retrieved from http://www.osterhoutgroup.com/downloads/pdf/product/R-7HL-TechSheet.pdf on Jun. 20, 2018.
Phillips, Jon, Hands on with Laster SeeThru, a direct augmented-reality challenge to Google Glass, Retrieved from https://www.pcworld.com/article/2105865/hands-on-with-laster-seethru-a-direct-augmented-reality-challenge-to-google-glass.html on Jun. 22, 2018.
Polap, David, et al. "Obstacle Detection as a Safety Alert in Augmented Reality Models by the Use of Deep Learning Techniques." Sensors (Basel) (2017). Retrieved from https://www.ncbi.nlm.nih.gov/pmc/articles/PMC5751448/ on Jun. 20, 2018.
Singularity Hub Staff, This Augmented Reality Helmet Helps Firefighters See Through Smoke to Save Lives, Retrieved from https://singularityhub.com/2017/06/28/this-augmented-reality-helmet-helps-firefighters-see-through-smoke-to-save-lives/#sm.00013g1l63cseeyjw2l1fob4gx02f on Jun. 20, 2018.
Upskill, Comm industrial equipment manufacturing use cases, Retrieved from https://upskill.io/skylight/industries/industrial-equipment/ on Jun. 20, 2018.
Upskill, Getting the Torque Just Right with Skylight Could Save Millions, Retrieved from https://upskill.io/landing/ge-aviation-case-study/ on Jun. 20, 2018.
USPTO, Final Office Action in Related Matter U.S. Appl. No. 16/007,204, dated May 17, 2019.
USPTO, Non-Final Office Action in Related Matter U.S. Appl. No. 16/007,204, dated Dec. 10, 2018.
Vive, HTC Vive Pro, Retrieved from https://www.vive.com/us/vive-pro-vr/?gclid=CjwKCAjwlcXXBRBhEiwApfHGTZTvHlnsmDrpO7DC7pDJaBzlpsbG7a-U2iWrGgBpoiwc07DoRYThaxoCLVMQAvD_BwE on Jun. 20, 2018.
Xiang et al., Object Detection by 3D Aspectlets and Occlusion Reasoning, 4th International IEEE Workshop on 3D Representation and Recognition (3dRR), 2013.
Young, Bruce, Response to Final Office Action in Related Matter U.S. Appl. No. 16/007,204, dated Jul. 17, 2019.
Young, Bruce, Response to Non-Final Office Action in Related Matter U.S. Appl. No. 16/007,204, dated Mar. 11, 2019.
Fink, AR Gesture Control Arrives, Consumer Tech, Sep. 8, 2017, pp. 1-5.
Kilkmeier, et al., With a Little Help from a Holographic Friend: The OpenIMPRESS Mixed Reality Telepresence Toolkit for Remote Collaboration Systems, Proceedings of the 24th ACM Symposium on Virtual Reality Software and Technology, Nov. 28, 2018, pp. 1-11.
Kim, et al., Real-Time Human Pose Estimation and Gesture Recognition from Depth Images Using Superpixels and SVM Classifier, Sensors, Jun. 2015, (6):12410-27.
Le Chenechal, et al. Vishnu: Virtual Immersive Support for HelpiNg Users, 2016 IEEE Third VR International Workshop on Collaborative Virtual Environments (3DCVE), Mar. 20, 2016 (p. 9-12) IEEE.
Palladino, Disney Research Creates Avatars That Can Strike a Pose to Match a Person's Movements in Augmented Reality, Jul. 23, 2018 https://next.reality.news/news/disney-research-creates-avatars-can-strike-pose-match-persons-movements-augmented-reality-0186149/.

(56) References Cited

OTHER PUBLICATIONS

Pandey, et al., Real-Time Egocentric Gesture Recognition on Mobile Head Mounted Displays, arXiv preprint arXiv:1712:04961, Dec. 13, 2017.
Piumsomboon, et al., Exploring Enhancements for Remote Mixed Reality Collaboration, Siggragh Asia 2017 Mobile Graphics & Interactive Applications, 22/27/2017, pp. 1-5.
Piumsomboon, et al., Mini-Me An Adaptive Avatar for Mixed Reality Remote Collaboration, CHI 2018, Feb. 21, 2018.
USPTO, Final Office Action in Related Matter U.S. Appl. No. 16/007,335, dated Apr. 28, 2020.
USPTO, Non-Final Office Action in Related Matter U.S. Appl. No. 16/230,278, dated Feb. 21, 2020.
USPTO, Non-Final Office Action in Related Matter U.S. Appl. No. 16/353,847, dated Feb. 7, 2020.
USPTO, Non-Final Office Action in Related Matter U.S. Appl. No. 16/208,799, dated Feb. 26, 2020.
USPTO, Non-Final Office Action in Related Matter U.S. Appl. No. 16/353,885, dated Mar. 18, 2020.
USPTO, Notice of Allowance in Related Matter U.S. Appl. No. 16/031,797, dated Feb. 21, 2020.
USPTO, Notice of Allowance in Related Matter U.S. Appl. No. 16/135,119, dated Feb. 10, 2020.
USPTO, Notice of Allowance in Related Matter U.S. Appl. No. 16/135,214, dated Feb. 7, 2020.
Young, Bruce, Response to Final Office Action in Related Matter U.S. Appl. No. 16/135,175, dated Jan. 31, 2020.
USPTO, Non-Final Office Action in Related Matter U.S. Appl. No. 16/208,799, dated Oct. 2, 2020.
USPTO, Notice of Allowance in Related Matter U.S. Appl. No. 116/358,482, dated Nov. 18, 2020.
USPTO, Notice of Allowance in Related Matter U.S. Appl. No. 16/358,495, dated Sep. 21, 2020.
USPTO, Notice of Allowance in Related Matter U.S. Appl. No. 16/123,543, dated Sep. 16, 2020.
USPTO, Notice of Allowance in Related Matter U.S. Appl. No. 16/230,278, dated Nov. 16, 2020.
Young, Bruce, Response to Final Office Action in Related Matter U.S. Appl. No. 16/208,799, dated Nov. 19, 2020.
Young, Bruce, Response to Final Office Action in Related Matter U.S. Appl. No. 16/230,278 dated Oct. 21, 2020.
Young, Bruce, Response to Final Office Action in Related Matter U.S. Appl. No. 16/353,885 dated Nov. 6, 2020.
Young, Bruce, Response to Final Office Action in Related Matter U.S. Appl. No. 16/0353,885 dated Nov. 6, 2020.
Elliott LR, Hill SG, Barnes M. Gesture-based controls for robots: oven/iew and implications for use by Soldiers. US Army Research Laboratory Aberdeen Proving Ground United States; Jul. 1, 2016.
Hardesty, Larry, MIT News, Guiding robot planes with hand gestures, Mar. 14, 2012, Retrieved from http://news.mit.edu/2012/robots-hand-gestures-0314 on Jul. 21, 2020.
USPTO, Final Office Action in Related Matter U.S. Appl. No. 16/0311,772, dated Feb. 3, 2020.
USPTO, Final Office Action in Related Matter U.S. Appl. No. 16/208,799, dated Jul. 14, 2020.
USPTO, Final Office Action in Related Matter U.S. Appl. No. 16/353,885, dated Sep. 10, 2020.
USPTO, Non-Final Office Action in Related Matter U.S. Appl. No. 116/358,482, dated Apr. 9, 2020.
USPTO, Non-Final Office Action in Related Matter U.S. Appl. No. 16/353,495, dated Apr. 9, 2020.
USPTO, Non-Final Office Action in Related Matter U.S. Appl. No. 16/123,543, dated Jun. 2, 2020.
USPTO, Notice of Allowance in Related Matter U.S. Appl. No. 16/135,198, dated Jun. 5, 2020.
USPTO, Notice of Allowance in Related Matter U.S. Appl. No. 16/0311,772, dated Jun. 24, 2020.
Young, Bruce, Response to Final Office Action in Related Matter U.S. Appl. No. 16/007,335, dated Jul. 28, 2020.
Young, Bruce, Response to Final Office Action in Related Matter 16/031,772, dated Jun. 1, 2020.
Young, Bruce, Response to Final Office Action in Related Matter U.S. Appl. No. 16/123,543 dated May 18, 2020.
Young, Bruce, Response to Final Office Action in Related Matter U.S. Appl. No. 16/135,198, dated May 29, 2020.
Young, Bruce, Response to Final Office Action in Related Matter U.S. Appl. No. 16/208,799, dated Sep. 17, 2020.
Young, Bruce, Response to Non-Final Office Action in Related Matter U.S. Appl. No. 15/353,847, dated May 7, 2020.
Young, Bruce, Response to non-Final Office Action in Related Matter U.S. Appl. No. 16/123,543, dated Jul. 25, 2020.
Young, Bruce, Response to non-Final Office Action in Related Matter U.S. Appl. No. 16/135,175, dated Jun. 26, 2020.
Young, Bruce, Response to Non-Final Office Action in Related Matter U.S. Appl. No. 16/208,799, dated May 26, 2020.
Young, Bruce, Response to Non-Final Office Action in Related Matter U.S. Appl. No. 16/230,278 dated May 21, 2020.
Young, Bruce, Response to Non-Final Office Action in Related Matter U.S. Appl. No. 16/358,482, dated Aug. 10, 2020.
Young, Bruce, Response to Non-Final Office Action in Related Matter U.S. Appl. No. 16/358,495, dated Aug. 5, 2020.
Young, Bruce, Response to Non-Final Office Action in Related Matter U.S. Appl. No. 160353,885 dated Jun. 18, 2020.
Young, Bruce, Supplemental Amendment in Related Matter U.S. Appl. No. 16/358,482, dated Aug. 28, 2020.
Young, Bruce, Supplemental Response in Related Matter U.S. Appl. No. 16/358,495, dated Aug. 26, 2020.
YouTube Video, How to Convert a selection into a layer mask in Photoshop CS6 | lynda.com, played from https://www.youtube.com/watch?v=3F4XUS45MUk on Jun. 2, 2020, Uploaded to YouTube on Jun. 15, 2015, Transcript and Screenshots submitted.
USPTO, Final Office Action for Related U.S. Appl. No. 16/353,885, dated Mar. 16, 2021.
USPTO, Non-Final Office Action for Related U.S. Appl. No. 16/007,335, dated Dec. 24, 2020.
Young, Bruce, Response to Non-Final Office Action in Related Matter 160353,885 dated Feb. 4, 2021.

* cited by examiner

| Message | Point A | Point B | Point C |
|---|---|---|---|
| Stop | Vibration Yes ("Y") | Y | Y |
| Check Status | Vibration No ("N") | Y | Y |
| Turn Right | N | Y | N |
| Turn Left | N | N | Y |

FIG. 10A

| Message | Point A | Point B | Point C |
|---|---|---|---|
| Go Forward | Y | Y | Y |
| Check Status | N | Y | Y |
| Look at Object | N | Y | N |
| Call Supervisor | N | N | Y |

FIG. 10B

INTEGRATING A USER OF A HEAD-MOUNTED DISPLAY INTO A PROCESS

CROSS-REFERENCE TO RELATED APPLICATIONS

This application is a continuation of U.S. patent application Ser. No. 16/208,799, entitled DIRECTIONAL INSTRUCTIONS IN AN HYBRID REALITY SYSTEM, filed on Dec. 4, 2018, the contents of which are incorporated by reference herein for any and all purposes.

BACKGROUND

Technical Field

The present subject matter relates to using a Virtual Reality (VR) or Augmented Reality (AR) system to provide compulsory, crucial or imperative instructions in order to compel a user's action.

Background Art

Many situations require the presentation information to a user in a way that the user can receive the information when it is needed and ensures that the user acts accordingly. One of many different professions where this is important is for emergency responders where the ability to receive the right information at the right time can be a matter of life or death. Traditionally, emergency responders have relied on audio transmissions over a radio for a majority of their information, but that is changing with the advent of widespread wireless digital communication.

Another new technology that is making its way into the world of emergency responders is digital displays. These displays may be on a handheld device, such as a mobile phone, or on a head-mounted display (HMD), such as a virtual reality (VR) display or an augmented reality (AR) display, which may be integrated into their emergency equipment, such as their helmet. Textual information can be presented to the emergency responder through the display and the information can be updated in real-time through the digital wireless interface from a command center or other information sources.

BRIEF DESCRIPTION OF THE DRAWINGS

The accompanying drawings, which are incorporated in and constitute part of the specification, illustrate various embodiments. Together with the general description, the drawings serve to explain various principles. In the drawings:

FIGS. 10A and 10B show embodiments of using different combinations of vibrations from three haptic transducers to deliver more than three messages to the user in two different contexts, respectively.

DETAILED DESCRIPTION

Figure 1A:
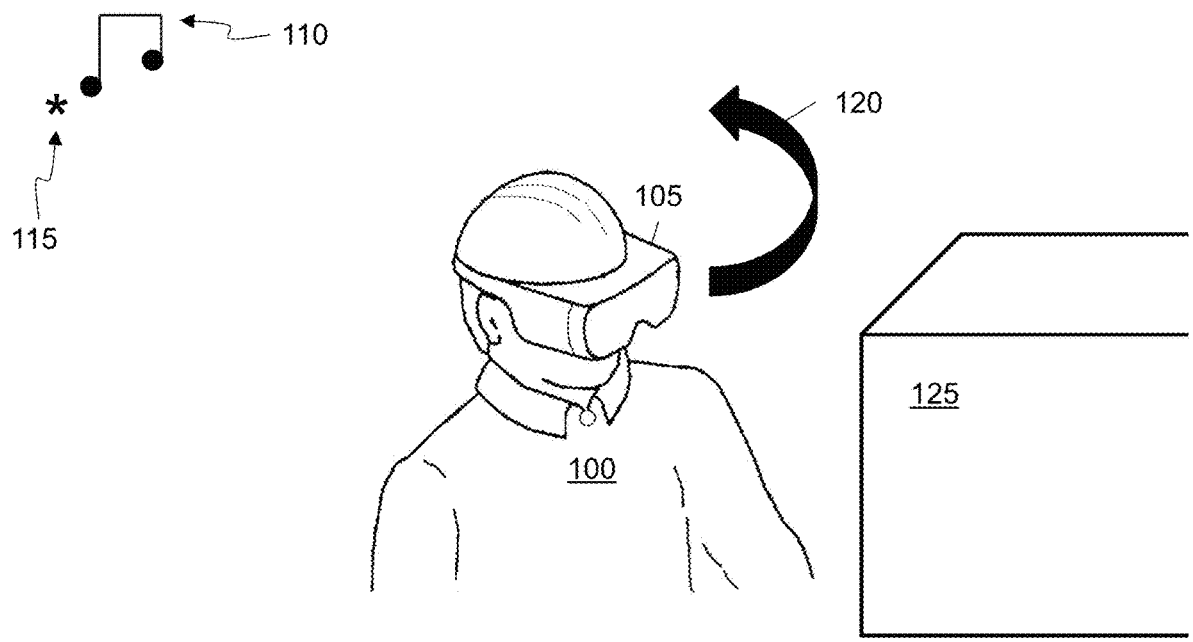
FIG. 1A shows a user wearing an embodiment of a head-mounted display presenting a sound at a point in space not in view.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures and components have been described at a relatively high-level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this specification. Some descriptive terms and phrases are presented in the following paragraphs for clarity.

Hybrid-reality (HR), as the phrase is used herein, refers to an image that merges real-world imagery with imagery created in a computer, which is sometimes called virtual imagery. While an HR image can be a still image, it can also be a moving image, such as imagery created using a video stream. HR can be displayed by a traditional two-dimensional display device, such as a computer monitor, one or more projectors, or a smartphone screen. An HR system can be based on a device such as a microscope, binoculars, or a telescope, with virtual imagery is superimposed over the image captured by the device. In such HR systems, an eyepiece of a device may be considered the display of the system. HR imagery can also be displayed by a head-mounted display (HMD). Many different technologies can be used in an HMD to display HR imagery. A virtual reality (VR) HMD system may receive images of a real-world object, objects, or scene, and composite those images with a virtual object, objects, or scene to create an HR image. An augmented reality (AR) HMD system may present a virtual object, objects, or scene on a transparent screen which then naturally mixes the virtual imagery with a view of a scene in the real-world. A display which mixes live video with virtual objects is sometimes denoted AR, but for the purposes of this disclosure, an AR HMD includes at least a portion of the display area that is transparent to allow at least some of the user's view of the real-world to be directly viewed through the transparent portion of the AR HMD. The display used by an HR system represents a scene which is a visible portion of the whole environment. As used herein, the term "scene" and "field of view" (FOV) are used to indicate what is visible to a user.

The word "occlude" is used herein to mean that a pixel of a virtual element is mixed with an image of another object to change the way the object is perceived by a viewer. In a VR HMD, this can be done through use of a compositing process to mix the two images, a Z-buffer technique to remove elements of the image that are hidden from view, a painter's algorithm to render closer objects later in the rendering process, or any other technique that can replace a pixel of the image of the real-world object with a different pixel value generated from any blend of real-world object pixel value and an HR system determined pixel value. In an AR HMD, the virtual object occludes the real-world object if the virtual object is rendered, transparently or opaquely, in the line of sight of the user as they view the real-world object. In the following description, the terms "occlude", "transparency", "rendering" and "overlay" are used to denote the mixing or blending of new pixel values with existing object pixel values in an HR display.

In some embodiments of HR systems, there are sensors which provide the information used to render the HR imagery. A sensor may be mounted on or near the display, on the viewer's body, or be remote from the user. Remote sensors may include, but are not limited to, fixed sensors attached in an environment, sensors attached to robotic extensions, sensors attached to autonomous or semi-autonomous drones, or sensors attached to other persons. Data from the sensors may be raw or filtered. Data from the sensors may be transmitted wirelessly or using a wired connection.

Sensors used by some embodiments of HR systems include, but are not limited to, a camera that captures images in the visible spectrum, an infrared depth camera, a microphone, a sound locator, a Hall effect sensor, an air-flow meter, a fuel level sensor, an oxygen sensor, an electronic nose, a gas detector, an anemometer, a mass flow sensor, a Geiger counter, a gyroscope, an infrared temperature sensor, a flame detector, a barometer, a pressure sensor, a pyrometer, a time-of-flight camera, radar, or lidar. Sensors in some HR system embodiments that may be attached to the user include, but are not limited to, a biosensor, a biochip, a heartbeat sensor, a pedometer, a skin resistance detector, or skin temperature detector.

The display technology used by an HR system embodiment may include any method of projecting an image to an eye. Conventional technologies include, but are not limited to, cathode ray tube (CRT), liquid crystal display (LCD), light emitting diode (LED), plasma, or organic LED (OLED) screens, or projectors based on those technologies or digital micromirror devices (DMD). It is also contemplated that virtual retina displays, such as direct drawing on the eye's retina using a holographic grating, may be used. It is also contemplated that direct machine to brain interfaces may be used in the future.

The display of an HR system may also be an HMD or a separate device, such as, but not limited to, a hand-held mobile phone, a tablet, a fixed monitor or a TV screen.

The connection technology used by an HR system may include any physical link and associated protocols, such as, but not limited to, wires, transmission lines, solder bumps, near-field connections, infra-red connections, or radio frequency (RF) connections such as cellular, satellite or Wi-Fi® (a registered trademark of the Wi-Fi Alliance). Virtual connections, such as software links, may also be used to connect to external networks and/or external compute.

In many HR embodiments, aural stimuli and information may be provided by a sound system. The sound technology may include monaural, binaural, or multi-channel systems. A binaural system may include a headset or another two-speaker system but may also include systems with more than two speakers directed to the ears. The sounds may be presented as 3D audio, where each sound has a perceived position in space, achieved by using reverberation and head-related transfer functions to mimic how sounds change as they move in a particular space.

In many HR system embodiments, objects in the display may move. The movement may be due to the user moving within the environment, for example walking, crouching, turning, or tilting the head. The movement may be due to an object moving, for example a dog running away, a car coming towards the user, or a person entering the FOV. The movement may also be due to an artificial movement, for example the user moving an object on a display or changing the size of the FOV. In one embodiment, the motion may be due to the user deliberately distorting all or part of the FOV, for example adding a virtual fish-eye lens. In the following description, all motion is considered relative; any motion may be resolved to a motion from a single frame of reference, for example the user's viewpoint.

When there is motion in an HR system, the perspective of any generated object overlay may be corrected so that it changes with the shape and position of the associated real-world object. This may be done with any conventional point-of-view transformation based on the angle of the object from the viewer; note that the transformation is not limited to simple linear or rotational functions, with some embodiments using non-Abelian transformations. It is contemplated that motion effects, for example blur or deliberate edge distortion, may also be added to a generated object overlay.

In some HR embodiments, images from cameras, whether sensitive to one or more of visible, infra-red, or microwave spectra, may be processed before algorithms are executed. Algorithms used after image processing for embodiments disclosed herein may include, but are not limited to, object recognition, motion detection, camera motion and zoom detection, light detection, facial recognition, text recognition, or mapping an unknown environment. The image processing may also use conventional filtering techniques, such as, but not limited to, static, adaptive, linear, non-linear, and Kalman filters. Deep-learning neural networks may be trained in some embodiments to mimic functions which are hard to create algorithmically. Image processing may also be used to prepare the image, for example by reducing noise, restoring the image, edge enhancement, or smoothing.

In some HR embodiments, objects may be detected in the FOV of one or more cameras. Objects may be detected by using conventional algorithms, such as, but not limited to, edge detection, feature detection (for example surface patches, corners and edges), greyscale matching, gradient matching, pose consistency, or database look-up using geometric hashing. Genetic algorithms and trained neural networks using unsupervised learning techniques may also be used in embodiments to detect types of objects, for example people, dogs, or trees.

In embodiments of an HR system, object may be performed on a single frame of a video stream, although techniques using multiple frames are also envisioned. Advanced techniques, such as, but not limited to, Optical Flow, camera motion, and object motion detection may be used between frames to enhance object recognition in each frame.

After object recognition, rendering the object may be done by the HR system embodiment using databases of similar objects, the geometry of the detected object, or how the object is lit, for example specular reflections or bumps.

In some embodiments of an HR system, the locations of objects may be generated from maps and object recognition from sensor data. Mapping data may be generated on the fly using conventional techniques, for example the Simultaneous Location and Mapping (SLAM) algorithm used to estimate locations using Bayesian methods, or extended Kalman filtering which linearizes a non-linear Kalman filter to optimally estimate the mean or covariance of a state (map), or particle filters which use Monte Carlo methods to estimate hidden states (map). The locations of objects may also be determined a priori, using techniques such as, but not limited to, reading blueprints, reading maps, receiving GPS locations, receiving relative positions to a known point (such as a cell tower, access point, or other person) determined using depth sensors, WiFi time-of-flight, or triangulation to at least three other points.

Gyroscope sensors on or near the HMD may be used in some embodiments to determine head position and to generate relative motion vectors which can be used to estimate location.

In embodiments of an HR system, sound data from one or microphones may be processed to detect specific sounds. Sounds that might be identified include, but are not limited to, human voices, glass breaking, human screams, gunshots, explosions, door slams, or a sound pattern a particular machine makes when defective. Gaussian Mixture Models and Hidden Markov Models may be used to generate statistical classifiers that are combined and looked up in a database of sound models. One advantage of using statistical classifiers is that sounds can be detected more consistently in noisy environments.

In some embodiments of an HR system, eye tracking of one or both viewer's eyes may be performed. Eye tracking may be used to measure the point of the viewer's gaze. In an HMD, the position of each eye is known, and so there is a reference frame for determining head-to-eye angles, and so the position and rotation of each eye can be used to estimate the gaze point. Eye position determination may be done using any suitable technique and/or device, including, but not limited to, devices attached to an eye, tracking the eye position using infra-red reflections, for example Purkinje images, or using the electric potential of the eye detected by electrodes placed near the eye which uses the electrical field generated by an eye independently of whether the eye is closed or not.

In some HR embodiments, input is used to control the HR system, either from the user of the HR system or from external actors. The methods of input used varies by embodiment, and each input type may control any or a subset of an HR system's function. For example, in some embodiments gestures are used as control input. A gesture may be detected by using other systems coupled to the HR system, such as, but not limited to, a camera, a stereo camera, a depth camera, a wired glove, or a controller. In some embodiments using a camera for gesture detection, the video stream is analyzed to detect the position and movement of an object, for example a hand, a finger, or a body pose. The position and motion can be used to generate a 3D or 2D path and, by using stochastic or pattern matching techniques, determine the most likely gesture used.

In another example embodiment, the user's head position and movement may be used as a gesture or direct control. The head position and movement may be determined by gyroscopes mounted into an HMD. In another example, a fixed source such as an electromagnetic beam may be affixed to a user or mounted in an HMD; coupled sensors can then track the electromagnetic beam as the user's head is moved.

In yet other example embodiments, the user may have a touch-pad or a plurality of touch sensors affixed to the body, for example built-in to a glove, a suit, or an HMD, coupled to the HR system. By touching a specific point, different input data can be generated. Note that the time of a touch or the pattern of touches may also generate different input types. In some technologies, touchless sensors using a proximity to the sensor can be used.

In some embodiments a physical input device is coupled to the HR system. The physical input device may be a mouse, a pen, a keyboard, or a wand. If a wand controller is used, the HR system tracks the position and location of the wand as well as presses of any buttons on the wand; the wand may be tracked using a camera, for example using object boundary recognition, using marker tracking where a specific shape or marker is detected in each video frame, or by wired/wireless data from the wand received by the HR system. In other example embodiments, a physical input device may be virtual, where a device is rendered on the head-mounted display and the user interacts with the virtual controller using other HR systems, such as, but not limited to, gaze direction, hand tracking, finger tracking, or gesture detection. In embodiments which use gaze direction as input, interaction with virtual menus rendered on the display may be used.

Further, in another example embodiment, a backwards-facing camera mounted in an HMD may be used to detect blinking or facial muscle movement. By tracking blink patterns or facial muscle motion, input gestures can be determined.

In some embodiments, breathing patterns may be detected using a pressure sensor mounted in a breathing system coupled to the HR system to detect changes in pressure. Breath patterns such as, but not limited to, blowing softly, exhaling hard, or inhaling suddenly may be used as input data for an HR control system.

In yet other example embodiments, sounds may be detected by one or more microphones coupled to the HR system. Specific sounds, such as, but limited to, vocalizations (e.g. scream, shout, lip buzz, snort, whistle), stamping, or clapping, may detected using stochastic or pattern matching techniques on received audio data. In some embodiments, more than one microphone may be used to place a sound in a location, allowing the position of a sound, for example a clap, to provide additional input control data. In some embodiments, voice control using natural language is used; speech recognition techniques such as trained neural networks or hidden Markov model algorithms are used by an HR system to determine what has been said.

It is anticipated that direct neural interfaces may be used in some embodiments to control an HR system.

Systems that display HR imagery are becoming increasingly common and are making their way from entertainment and gaming into industrial and commercial applications. Examples of systems that may find HR imagery useful include aiding a person doing a task, for example repairing machinery, testing a system, or responding to an emergency.

Many of the same environments where HR imagery might be used also to provide information to a user to direct movement. This information may be presented using many different stimuli or combinations of stimuli. Since an HR system cannot physically constrain the user, any stimulus provided by an HR system is purely suggestive, but correctly done, can be interpreted by the user as an imperative.

In an HR system which aids a person doing a task, for example repairing machinery, testing a system, or responding to an emergency, there may be areas of the environment that cannot be physically entered because of potential danger, for example exposure to toxins, possible electrical shock, an unbreathable atmosphere, or a potentially unstable platform. In another example, there may be objects in the environment that should be avoided, for example a critical component that cannot be repaired if broken, a sensitive detector that cannot be touched, or a device that may require a time-consuming and complex reconfiguration if disturbed. In yet another example, a task may require that the person is at a specific height or in a specific orientation in order to remain safe.

AR systems can be used to train user movement, for example physical exercise regimens. Such AR systems work by first showing the required movement or body position in sub-steps, and then providing feedback as the user attempts to mimic the shown example. However, this technology necessarily allows for a wide range of potential movements within each sub-step since user movement is not constrained by the system. Systems and methods for encouraging and reinforcing user motion within specified ranges may be helpful in improving the effectiveness of similar systems.

As described herein, the possible motions for a head are denoted as follows: "depression" is the positioning of the head in a downward motion with other body motion; "elevation" is the positioning of the head in a upward motion with other body motion; "excursion" is the motion of the head left, right, back or forward with other body motion; "rotation" is the turning of the head in either a left or right direction with no body movement; and "nod" is an up or down movement with no body movement. In general, depression, elevation and excursion are a group of motions denoted herein as "head positioning," with rotation and nodding a group of motions denoted herein as "gaze positioning." In the example embodiments, head positioning and gaze position directions are sometimes differentiated without limitation. It is anticipated that instruction consistency across different platforms may be useful in establishing a desired user response, such as the various mouse action metaphors agreed upon today.

As used herein, a "situation" of an object may refer to any aspect of the objects position and/or orientation in three-dimensional space. The situation may refer to any value of an object's six degrees of freedom, such as up/down, forward/back, left/right, roll, pitch, and yaw. In some cases, the situation of an object may refer to only the position of an object with respect to a 3-dimensional axis without referring to its orientation (e.g. roll, pitch, and yaw), or the situation may refer only to the object's orientation without referring to its position. But other cases, the situation of the object may refer to one or more position and/or orientation values.

An HR system may be used to help guide a user into a specified position and/or orientation by offering direction stimuli and reinforcing those stimuli. Stimuli that may applied to the HR system include, but are not limited to, sounds, haptic stimuli, and visual effects. The update or repeat rate of a stimulus may be varied to add emphasis. Other time-varying attributes such as position, amplitude, frequency, or phase of a stimulus may be used to denote direction or to emphasize a guidance. Stimuli may also be modulated by other stimuli in combination.

An example stimulus that may be used by an HR system embodiment is the placement of a sound so that it appears to the user at a location in space. For example, placing a buzzing sound may encourage the user of an HR system to move towards the sound to find out why there is such a sound. To add emphasis to a sound, other stimuli may be combined, such as, but not limited to, a voice command such as "Look at buzzing sound", a flash on the screen to distract the user and encourage focus on the sound, or directional virtual objects added to the display pointed towards the sound.

Any stimulus that is positional, for example a sound placed at a point by an HR embodiment, may be moved as part of a larger stimulus. For example, the sound may be placed to originate at the current gaze position or screen direction and then move over time and "hover" at the desired position. Note that the speed of apparent motion, the time of hovering, and any other attribute (such as volume or frequency) may be varied as the sound is moved.

A stimulus may also be negative by adding an effect to the current object in view or at the user gaze location as determined in an HR embodiment. For example, a strident alarm or flash on an object may encourage the user to look away. The object at the current gaze location may also be obscured, for example blurring or adding a covering by the display. In another example embodiment, an unpleasant, annoying, or uncomfortable sound may be played to indicate "not here", for example nails scratching down a chalkboard, a knife scraping on a bottle, a scream, a disc grinder or a baby crying.

In an example HR embodiment, a haptic stimulus may be applied. In order to create a haptic stimulus that has a direction, an HR system may use different techniques such as, but not limited to: (1) using amplitude and phase modulation of the haptic motion to indicate a general direction; (2) using one of a plurality of haptics pads that are placed in different positions on the user; or (3) using a combination of two or more haptic pads whose amplitude and phase are modulated to generate an apparent vector, similar to binaural stimuli. In one example embodiment, two haptic generators are placed on either side of the HMD and are modulated to generate a haptic vector with a direction and amplitude. In another example embodiment with two or haptic pads placed around the user, for example on the HMD, body suit, or gloves, motion and direction may be presented by moving the haptic pattern from one pad to another, often with an associated change in amplitude to emphasize the directional imperative presented to the user.

In another example HR embodiment, other stimuli may include the addition of smells to a breathing system, changing a temperature or a moisture level in a suit or glove, or using electrical signals to pads attached to, or near, a user's skin. Such stimuli may be useful to emphasize other visual, aural or tactile stimuli, but may be used alone if a direction can be connoted, for example using different nostrils or multiple skin sensors.

In an example HR embodiment, changes to the display over time can be used connote a direction. For example, a translation of the display in one or more of up, down, left or right directions by the HR system (without the head moving) may denote a direction, particularly if the movement accelerates in the preferred direction. In other HR embodiments, virtual objects may be added to the display to denote direction, for example arrows, sliding bars, thermometers, or even virtual instruments such as those found in airplane cockpits, such as a virtual artificial horizon or altimeter. In one HR embodiment, gradients such as brightness, distortion, or opacity may be applied on the display to indicate a direction in which to move.

In some scenarios, for example during a sequence of tasks to repair a machine, the gaze position is required to move from a current object to a different object. In one HR embodiment, the current object (and potentially other nearby objects) is obscured, for example by blurring, covering with opaque pixel values, or changing the opacity. The effect of deliberate occlusion of the object(s) near the current gaze location, as determined by the HR system, may also be enhanced in some embodiments by adding emphasis to the object to be viewed, such as, but not limited to, adding a time varying brightness to the target object, making the target object larger, or shaking the target object.

In example scenarios, it is the positioning of one or both of the user's hands that is to be achieved, for example placing a sensor on a real-world object at an optimum location. In an example embodiment, the HR system may render virtual objects which appear to be attached to the hands visible in the display, for example a path to follow, an arrow or a target; note that the virtual object may be rendered differently as the hand approaches the desired position. In one embodiment, the hand to be moved is occluded by a virtual hand which is used to indicate the desired hand action, such as, but not limited to, showing the virtual hand moving to the desired location, shaking the virtual hand in the desired direction, or pointing a finger in the desired direction. The virtual hand in one embodiment may become more transparent as the real-hand is moved.

In an example HR embodiment, occluding detail in one or more edges to the display over time can be used connote a direction. For example, a covering of details in the right edge of the display using a solid block of color made wider as time progresses is a direction to move to the left.

In another example HR embodiment, a virtual beam is rendered that corresponds to the current user position and orientation. The virtual beam is rendered as if a light source were attached to a fixed point on the HMD and so moves with the user. The virtual beam may be represented on the display, for example, by the drawing of an apparent ray of light coming out of the display onto the rendered scene, or by using a circle lighting objects as if there were a flashlight fixed to the HMD. In some embodiments, more than one virtual beam may be used. To aid guide the user, a virtual beam may have one or more associated virtual targets; by moving the beam onto a target, the user position and orientation may be set by an HR system. In some embodiments the virtual targets may be rendered differently according to context, for example an urgency value, beam proximity, or a danger value. The virtual targets may also be rendered differently according to whether gaze position or head position is to be set. In another example embodiment, a virtual beam is affixed to a user's hand, allowing the HR system to guide the hand to a desired location.

In another example HR embodiment, the directional guidance may be used to place the user in a desirable location for obtaining data. In some scenarios, the current task success may need to be determined by taking active measurements. In other scenarios, the value of environmental factors may determine the next course of action, for example determining the hottest object. Taking measurements in an optimal manner may be critical, for example placing a camera in an optimal position for assessing alignment, waiting a specified time for warm-up of an internal component whose location cannot be seen, or waiting for a period between data samples at specific port locations on a machine. By guiding an HR embodiment user to the optimal position, the chance of measurement success can be greatly increased, thus ensuring completion of the overall task.

In some example HR systems, a haptic stimulus may be combined with other stimuli, such as visual stimulus, acoustic stimulus, olfactory perceptive stimulus, gustatory stimulus, or combinations of three or more stimuli to deliver more detailed guidance for a user. For example, a glove which incorporates a haptic pad may be included as a part of the HR system along with a HMD with a 3D display and a speaker. In other embodiments, the HR system may include a vest, a jacket, a wristband, or other wearable which incorporates one or more haptic transducers. By including one or more haptic transducer equipped articles in the HR system, haptic stimuli from those articles may be used to deliver more complicated and/or detailed messages to the user. For example, by combining haptic stimuli from a HMD and a glove, both an alert and a guidance to move hands may be delivered. Also, by combining stimuli from a glove and a vest, jacket or band, more serious alert and guidance compared to a normal guidance to move away from a current location may be delivered. In one non-limiting example, a glove may provide a haptic stimulus to indicate that a user should move their hand in either direction, while at the same time the HMD may display an arrow, line, or guiding object to indicate the direction to move. The arrow, line or guiding object may be flashed, changed in color or shape, or popped up, depending on the embodiment, The HMD may also provide sound guidance to indicate the direction.

Some embodiments may change the strength of stimuli to indicate the urgency or importance of messages delivered. As one non-limiting example, providing both a weak haptic stimulus and a weak visual or audio stimulus may be used to indicate that the urgency of messages therefrom is low. Conversely providing both a strong haptic stimulus and strong visual or audio stimulus may be used to indicate that the message delivered by those stimuli is urgent. In some embodiments, a strong haptic stimulus combined with a weak visual or audio stimulus may be used to indicate that the messages therefrom are simply general guidance, but a weak haptic stimulus combined with a strong visual or audio stimulus may be used to indicate that the messages therefrom are a warning or restriction. Optionally, changing color or shape of visual stimuli, or popping up text messages, may be used to change an urgency or priority of a message.

FIG. 1A shows a user 100 wearing an embodiment of a head-mounted display 105 presenting a sound 110 at a point 115 in space not in view. The user 100 at the time of FIG. 1A is looking at object 125. To guide user 100 to look away from object 125 and look at point 115, the head-mounted display 105 presents a sound 110 via an audio output to user 100 that is perceived to be at point 115. The sound 110 may be modulated to emphasize the guidance, for example being loud at the start and reducing in volume as user 100 turns in the direction indicated by arrow 120.

Figure 1B:
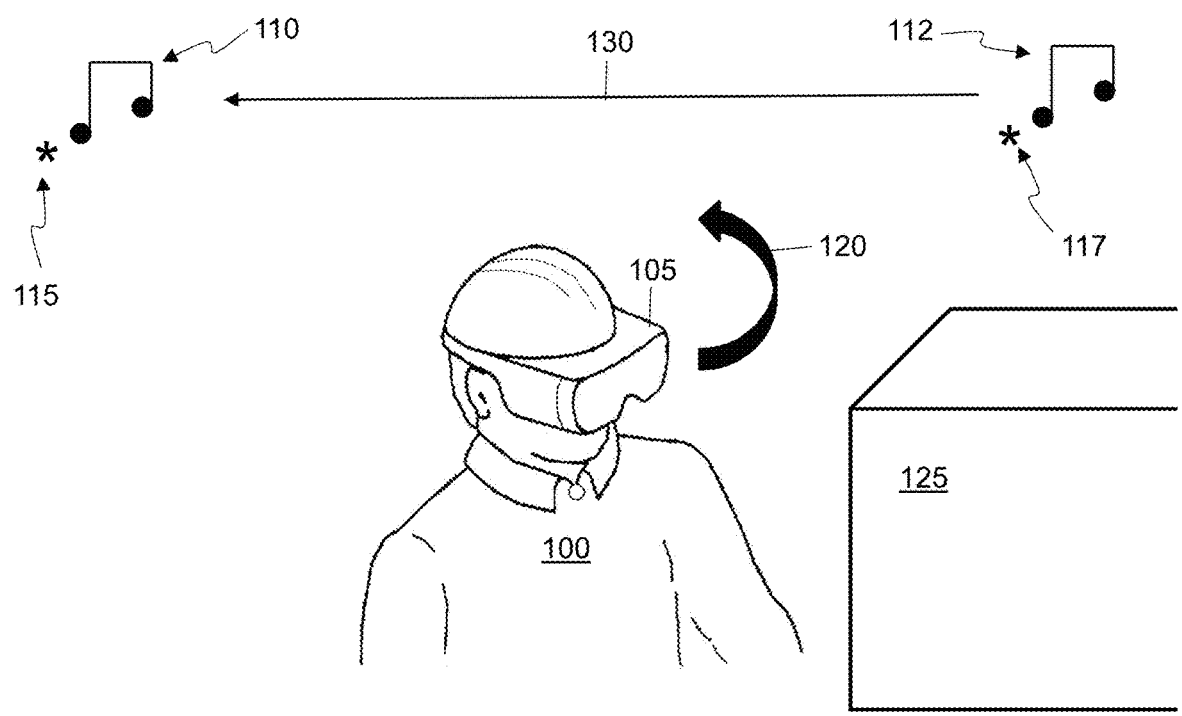
FIG. 1B shows a user wearing an embodiment of a head-mounted display presenting a sound moving to a point in space not in view.

FIG. 1B shows a user 100 wearing an embodiment of a head-mounted display 105 presenting a sound 110 at a point 115 in space not in view. The user 100 at the time of FIG. 1B is looking at object 125. To guide user 100 to look away from object 125 and look at point 115, the head-mounted display 105 first presents a sound 112 via an audio output to user 100 that is perceived to be at point 117. The presented sound is moved over time from point 117 to appear as sound 110 at point 115; note that the apparent motion of the sound 112, 110 may be smooth or non-continuous. The sound 112, 110 may be modulated to emphasize the guidance, for example being loud at the start and reducing in volume as user 100 turns in the direction indicated by arrow 120. In some embodiments, the sound sample 112 may be different from sound sample 110.

Figure 2A:
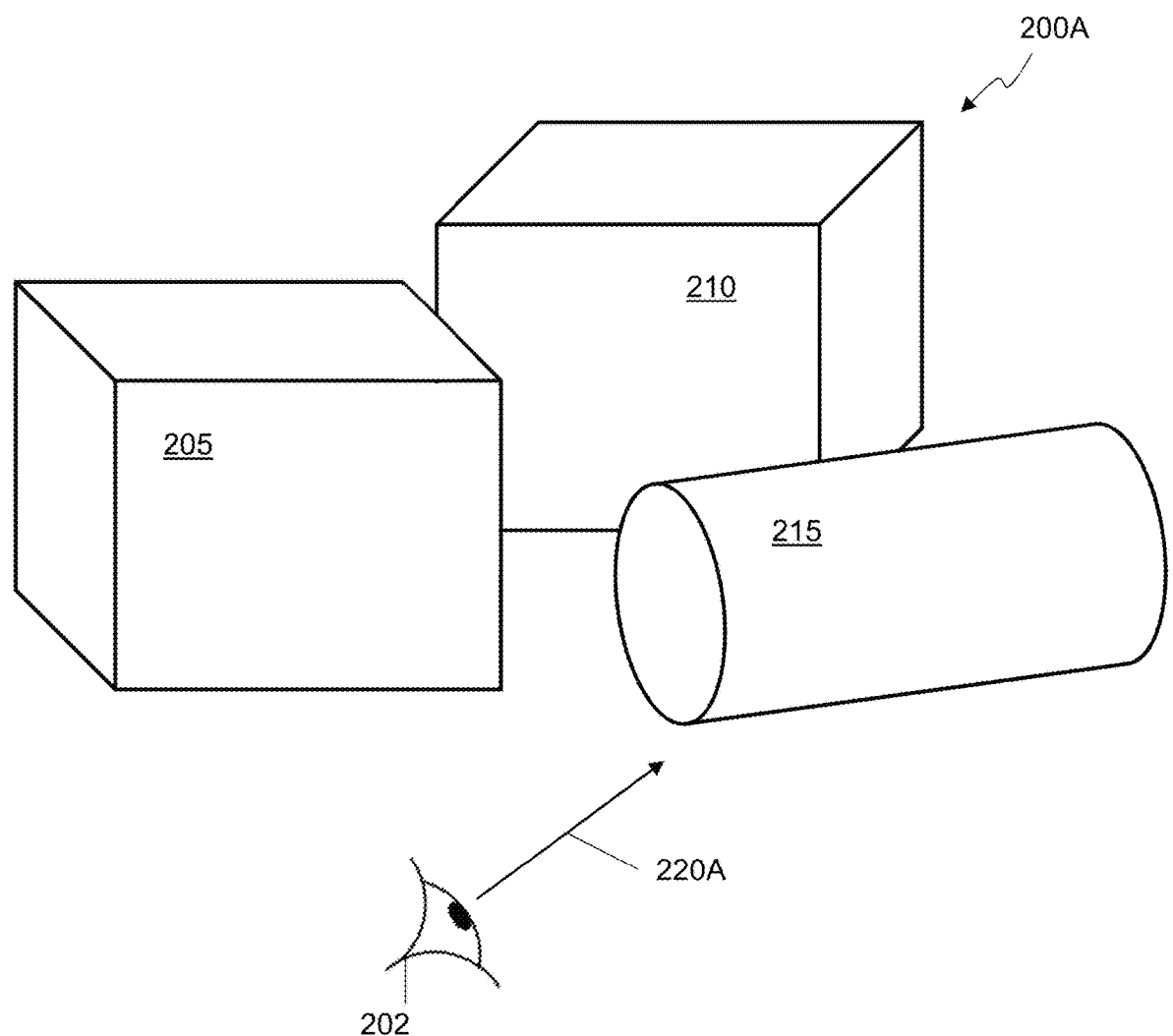
FIG. 2A shows a scene presented to a user wearing an embodiment of a head-mounted display.

FIG. 2A shows a scene 200A presented to a user wearing an embodiment of a head-mounted display. Rendered on the display are objects 205, 210, 215 and the gaze direction of the user is at object 215, as indicated by the eye 202 and line-of-sight ray 220A.

Figure 2B:
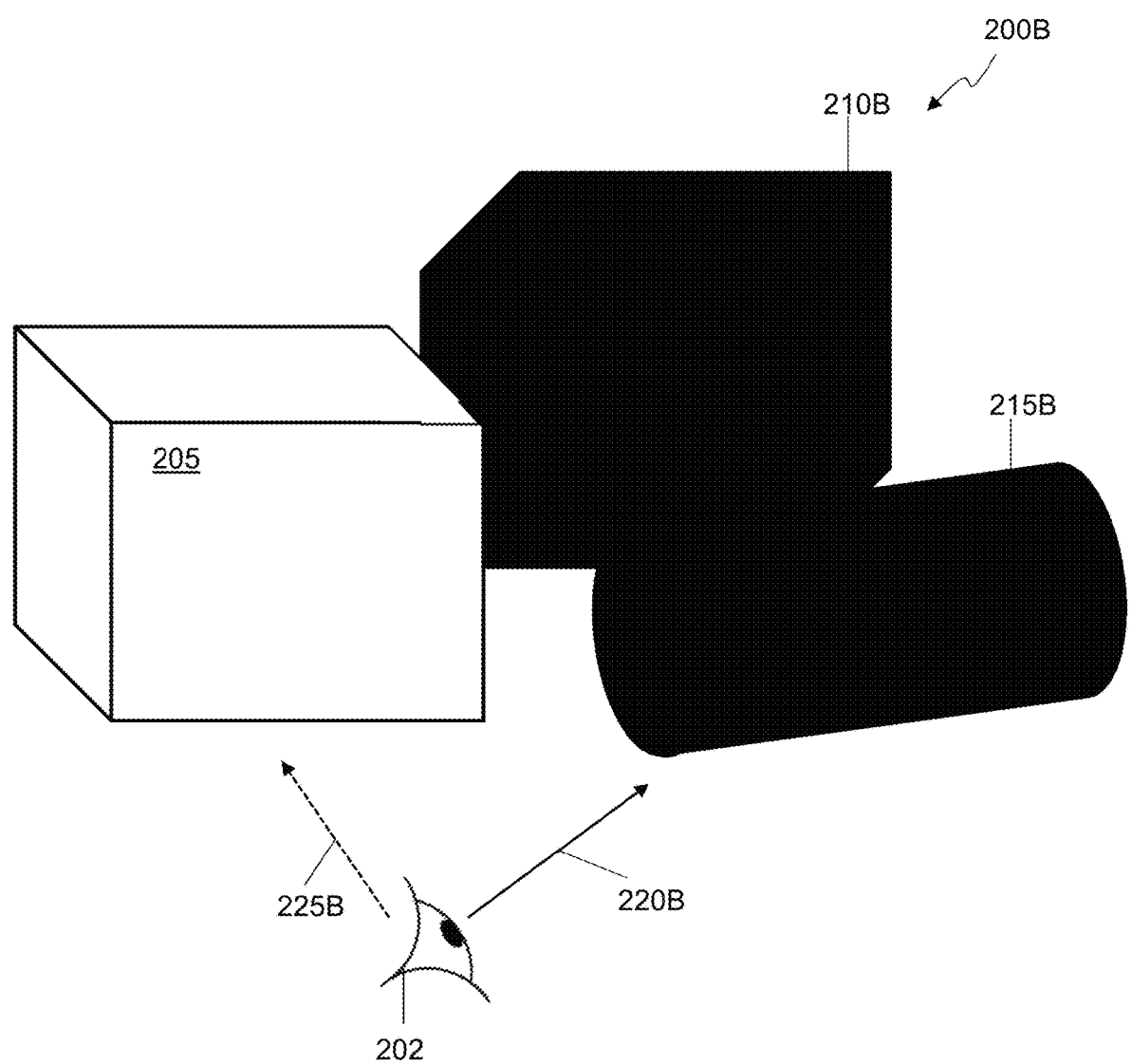
FIG. 2B shows a scene presented to a user wearing an embodiment of a head-mounted display with occluded objects.

FIG. 2B shows a scene 220B presented to a user wearing an embodiment of a head-mounted display at a time later than the scene rendered in FIG. 2A. Rendered on the display are objects 205, 210B, 215B and the gaze direction of the user is at object 215, as indicated by the eye 202 and line-of-sight ray 220B. At the time of FIG. 2B the system wishes the user eye gaze to move to object 205 as indicated by the dotted line-of-sight ray 225B, and so changes the rendering of objects 215, 210, as shown in FIG. 2A, by showing them in shadow as objects 215B, 210B. The appearance as a shadow may be represented by a transparency, a reduction of brightness, or a change of color of the objects 215B, 210B. In some embodiments, a background color of the scene may be selected as the shadow color to minimize the visibility of the objects 215B, 210B. In at least one embodiment, the objects 215B, 210B may be shaded so that their edges match the background color around their perimeters and the interior colors may be interpolated from the edge colors. In some HR systems the shadow may be created by rendering virtual objects 215B, 210B superimposed over visible objects 215, 205. Objects 215B, 210B may be selected by proximity to a 3D volume that contains the current gaze direction 220B. By rendering objects 215, 210 in shadow as virtual objects 215B, 210B and obscuring any details, the objects 215, 210 are made uninteresting to the user, who will find some other object in the display to look at. In some embodiments, the target object 205 may selected and enhanced; the enhancement may be a time-varying rendering effect. In some embodiments, all other objects near the target object 205 will be obscured.

Figure 2C:
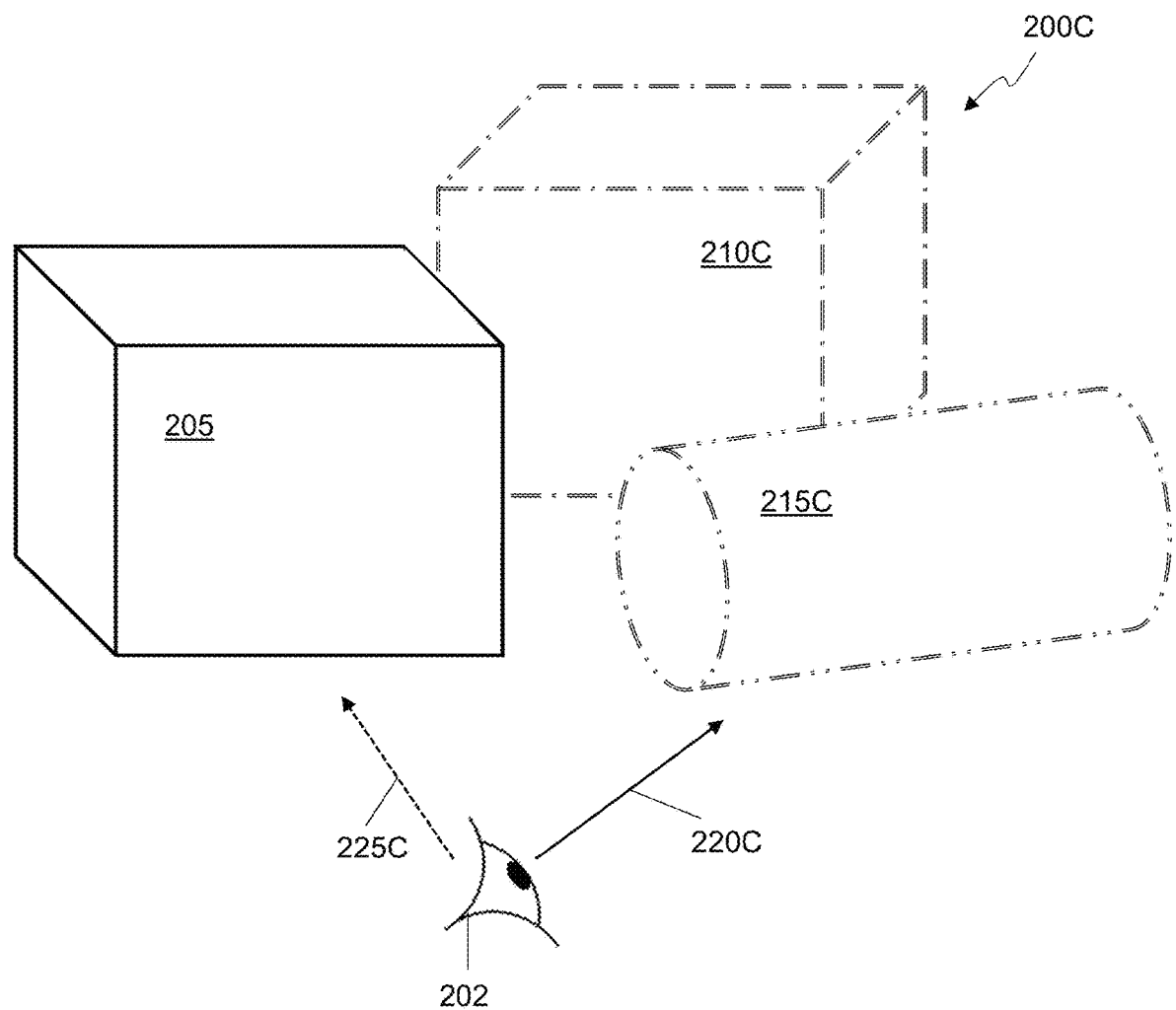
FIG. 2C shows a scene presented to a user wearing an embodiment of a head-mounted display with blurred objects.

FIG. 2C shows a scene 200C presented to a user wearing an embodiment of a head-mounted display at a time later than the scene rendered in FIG. 2A. Rendered on the display are objects 205, 210C, 215C and the gaze direction of the user is at object 215C, as indicated by the eye 202 and line-of-sight ray 220C. At the time of FIG. 2C the system wishes the user eye gaze to move to object 205 as indicated by the dotted line-of-sight ray 225C, and so changes the rendering of objects 215, 210, as shown in FIG. 2A, by presenting versions of the objects 215C, 210C with blurred visible edges. Objects 215, 210 may be selected by proximity to a 3D volume that contains the current gaze direction 220C. By rendering objects 215C, 210C in blur, the objects 215, 210 are made difficult to see to the user, who will find some other object in the display to look at. In some embodiments, the target object 205 may selected and enhanced; the enhancement may be a time-varying rendering effect. In some embodiments, all other objects near the target object 205 will be blurred.

Figure 3:
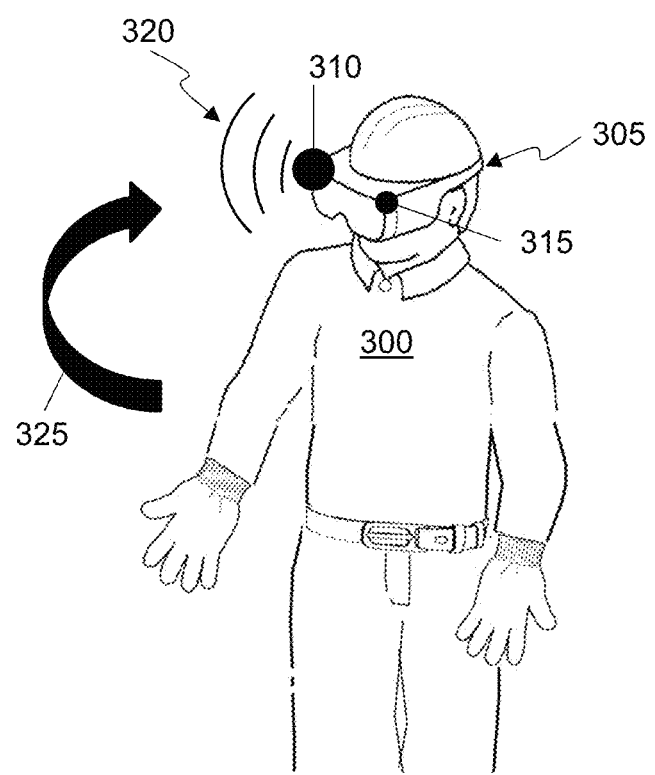
FIG. 3 shows a user wearing an embodiment of a head-mounted display with a pair of haptic pads providing a directional stimulus.

FIG. 3 shows a user 300 wearing an embodiment of a head-mounted display 305 with attached haptic pads 310, 315. At the time of FIG. 3, the HR system instructs user 300 to rotate the head in the direction shown by arrow 325. The stimulus to turn in the direction of arrow 325 is provided by haptic pads 310, 315 which each provide a different stimulus. Haptic pad 315 is shown at a size that indicates that the amplitude of vibration is small and pad 310 is shown at a size that indicates that the amplitude of vibration is larger, giving a net vibration towards pad 310 as shown by the schematic vibrations 320. In some embodiments, the user 300 may be trained to turn away from the larger vibrations, as shown by arrow 325, although in some cases, the user 300 may be trained to turn toward the larger vibrations. The direction of the apparent haptic vector felt by user 300 may be enhanced by changing the phase of vibrations in pads 310, 315 and well as the amplitude. In some embodiments, the haptic vector is made as time varying pulses in a direction to emphasize motion and urgency; this may be achieved by varying the amplitude and phase of both haptics pads over time.

Figure 4A:
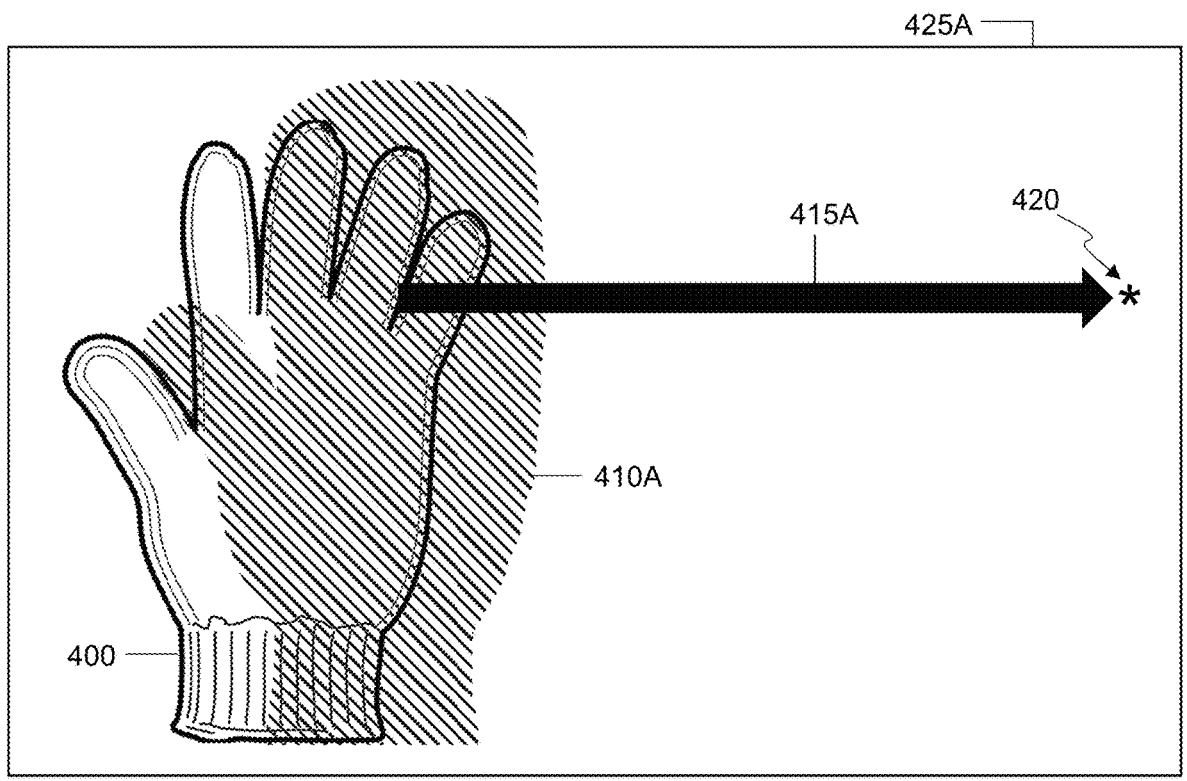
FIG. 4A/B show a time sequence of at least a portion of views presented to a user wearing an embodiment of a head-mounted display with a rendered virtual hand.

FIG. 4A shows at least a portion of a view 425A presented to a user wearing an embodiment of a head-mounted display with a rendered virtual hand 410A on the display. At the time of FIG. 4A, the HR system instructs the user to move real-world hand 400 closer to point 420 by overlaying a virtual hand 410A near the real-world hand 400 with an arrow 415A showing the direction to point 420. Note that some embodiments may show the point 420 on the display.

Figure 4B:
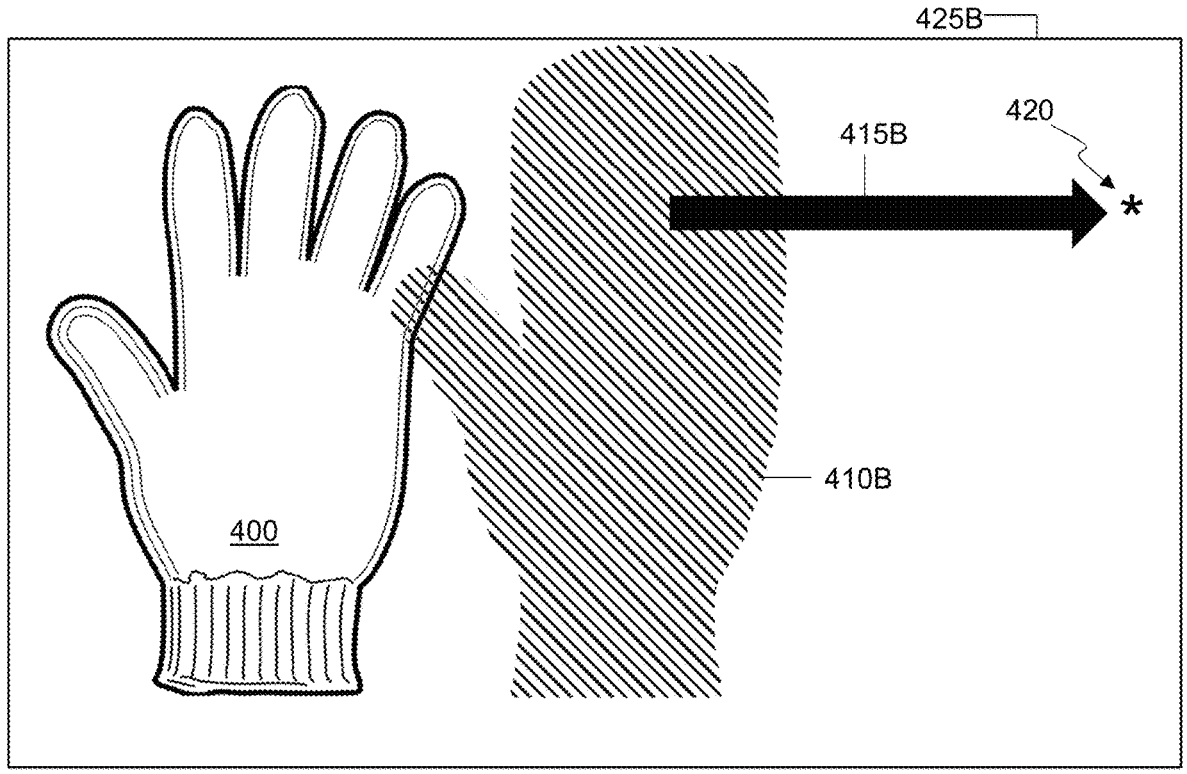

FIG. 4B shows at least a portion of a view 425B presented to a user wearing an embodiment of a head-mounted display with a rendered virtual hand 410B on the display. At another time different to the time of FIG. 4A, the HR system instructs the user to move real-world hand 400 closer to point 420 by overlaying a virtual hand 410B away the real-world hand 400 with an arrow 415B showing the direction to point 420. Note that some embodiments may show the point 420 on the display. In combination with the rendered scene 425A of FIG. 4A, the scene 425B of FIG. 4B shows the user samples of the required hand movement; note that the arrow 415B changes size compared to arrow 415A to emphasize the destination point for the real-world hand 400. In some embodiments the virtual hand 410B may be animated to show an example of desired movement of the real-world hand 400, and in some embodiment may show a complete and smooth path from the current hand position to the target hand position 420. In other embodiments, the virtual hand 410B may shake in the required direction, but not trace a specific path. If the virtual hand 410B is animated or moving, the arrow 415B might not be shown in some embodiments.

Figure 5A:
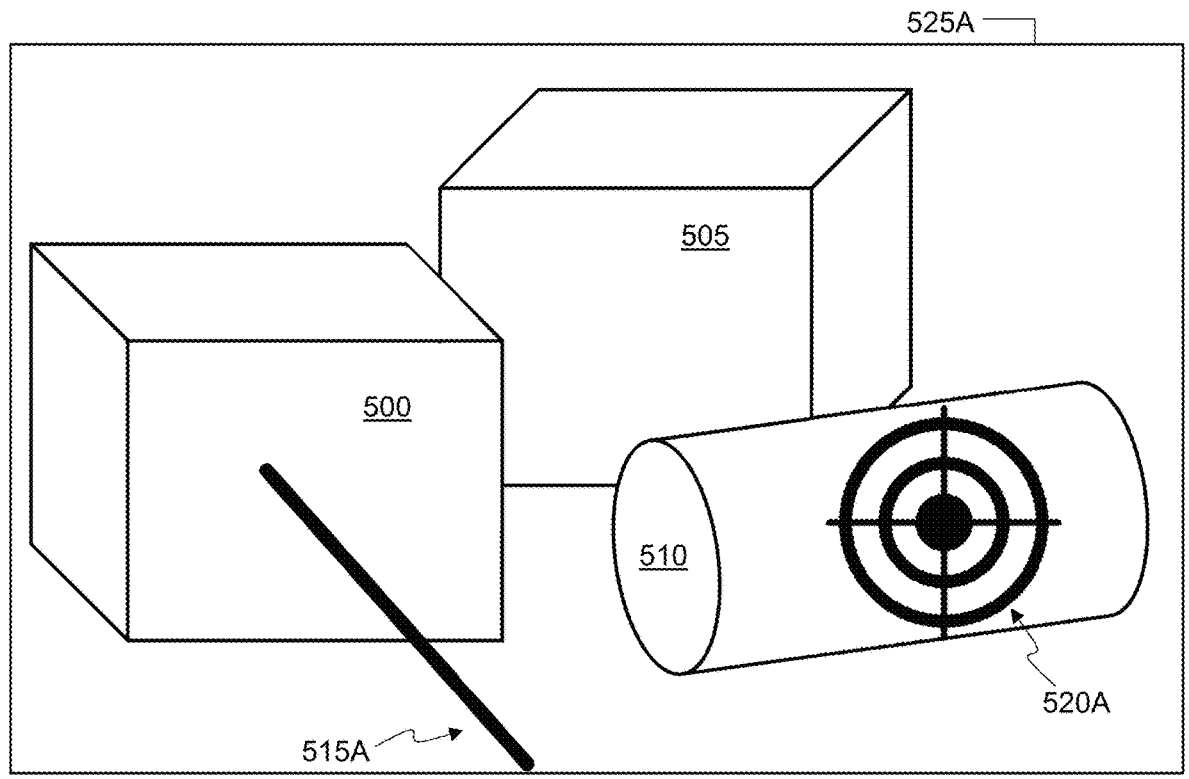
FIG. 5A/B show a time sequence at least a portion of a view presented to a user wearing an embodiment of a head-mounted display with a rendered virtual beam and a rendered virtual target.

FIG. 5A shows at least a portion of a view presented to a user wearing an embodiment of a head-mounted display with a rendered scene 525A including virtual beam 515A, a rendered virtual target 520A, and objects 500, 505, 510. At the time of FIG. 5A the HR system has determined that the direction of the head is a vector pointing straight into the center of the display. To guide the user's head through rotation angle of 90 degrees clockwise, the HR system generates a virtual beam 515A pointing at object 500; note that the direction of the rendered beam is arbitrary. At the desired angle of 90 degrees from virtual beam 515A, the HR system renders a virtual target 520A on object 510. This may prompt the user to move their head to align the virtual beam 515A onto target 520A; note that any combination of head rotation, elevation and/or depression is possible depending on the solid angle subtended between the virtual beam 515A and target 520A.

Figure 5B:
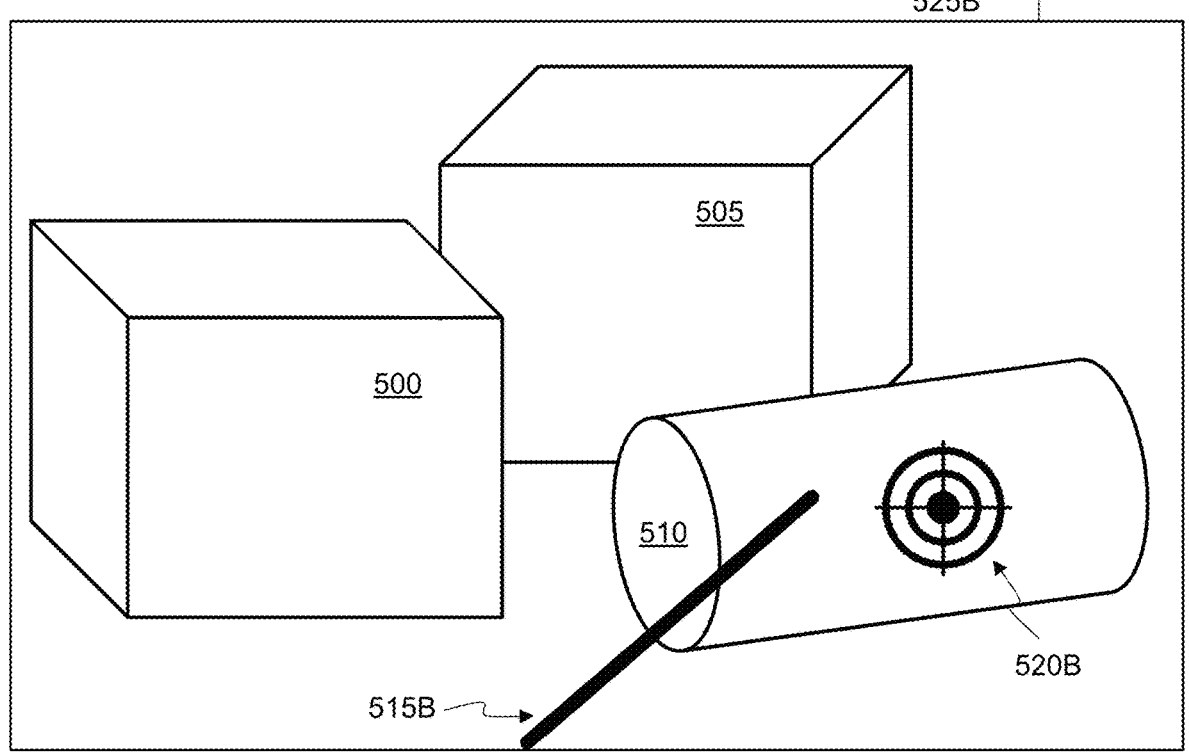

FIG. 5B shows scene 525B of the vignette of FIG. 5A at a later time when the user has rotated the head towards the target. Note the new position of virtual beam 515B which has tracked the motion of the head-mounted display, for example using data from mounted gyroscopes. Note also the rendering of target 520B, which is a smaller size compared to presentation of target 520A at the time of FIG. 5A, although this may not be done by all embodiments. This allows a positional accuracy to be set by the HR system in some embodiments. Note that in the embodiment shown, movement of the user's head does not cause the objects or the target to move. In other embodiments, movement of the user's head causes the objects 500, 505, 510 presented to the user to change based on the field of view of the user. The target 52B may also move based on movement of the user's head. In at least one embodiment, the virtual beam 515B may be fixed in the user's field of view so that the user is encouraged to move their head until the target 520B is moved to align with the virtual beam 515B. In some embodiments, if the desired movement is greater than that which can be displayed in a scene 525B, the virtual beam 520B or virtual target 520B may be shown at one edge of the screen and remain until the user has moved enough so that the actual desired point is within the scene 525B.

Figure 6A:
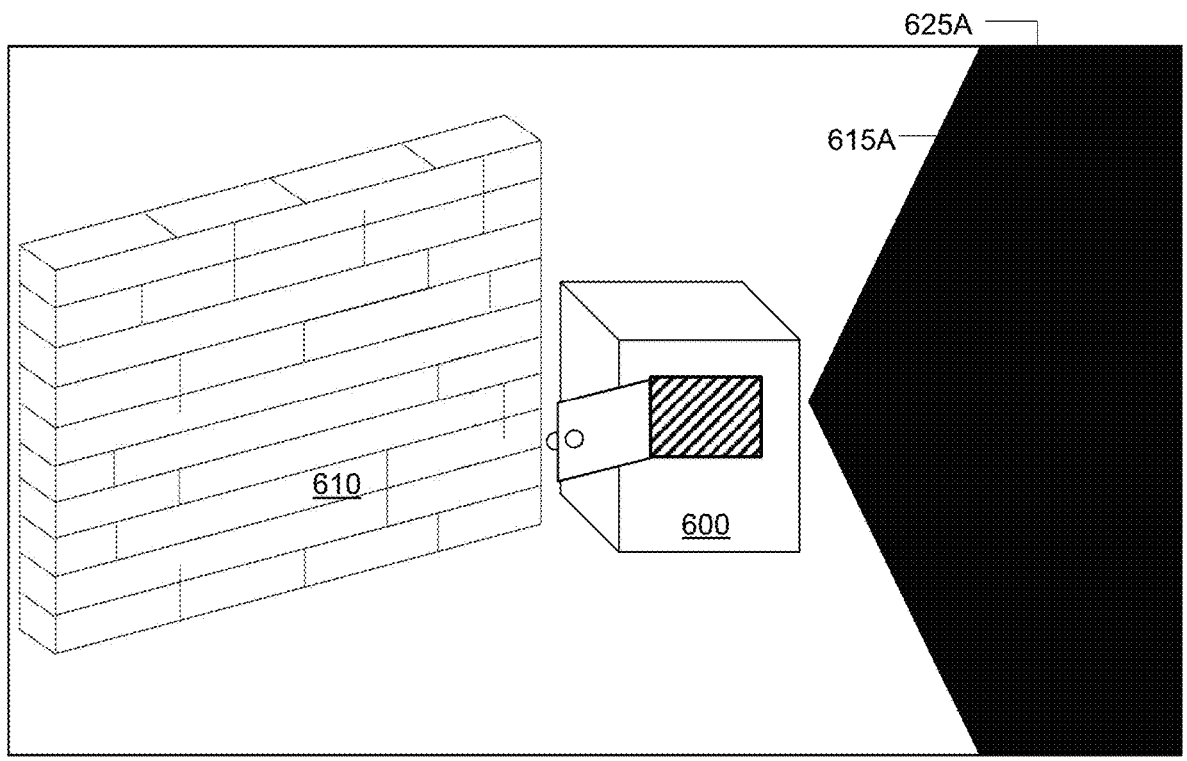
FIG. 6A/B show a time sequence at least a portion of a view presented to a user wearing an embodiment of a head-mounted display with one edge of the display with occluded details.

FIG. 6A shows at least a portion of a view presented to a user wearing an embodiment of a head-mounted display showing a scene 625A including objects 600, 610. In order to encourage the user's head to move towards the left, the right edge of the display is occluded using pointed shadow 615A. In other example embodiments, the shape, opacity and color of the occlusion may vary.

Figure 6B:
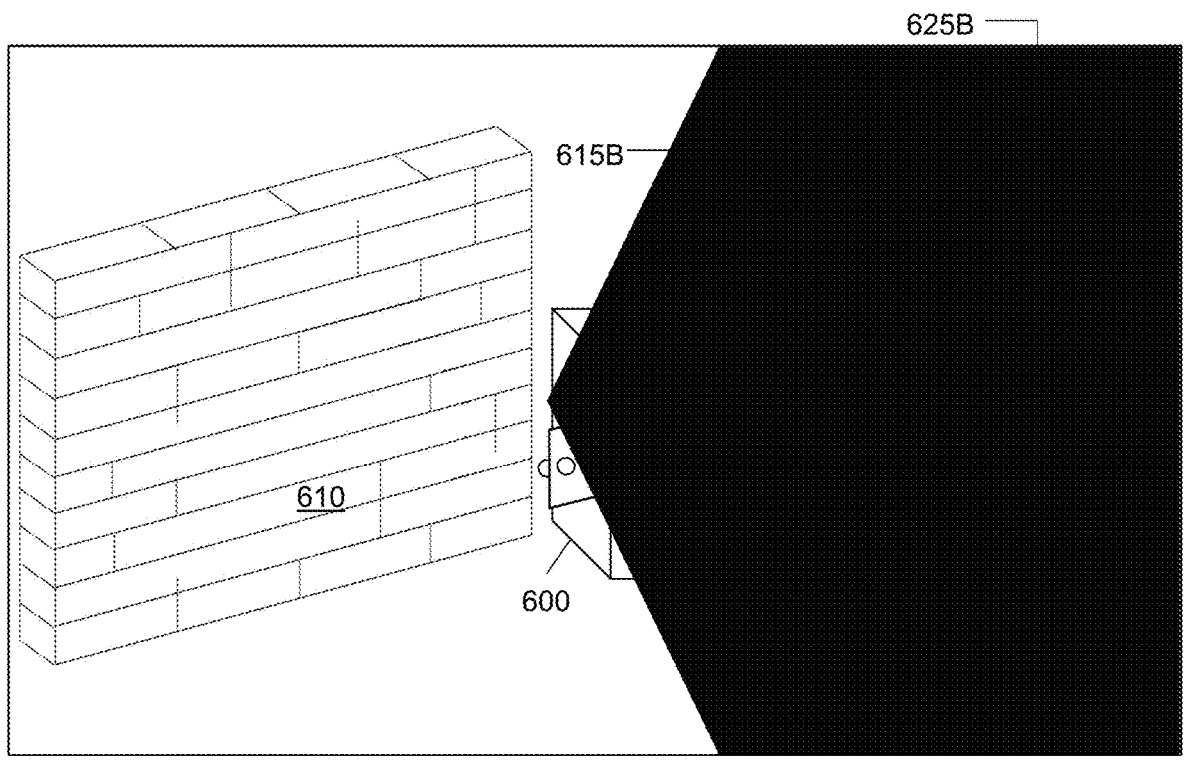

FIG. 6B shows scene 625B the vignette of FIG. 6A at a later time where the user's head has still not moved. To emphasize a potential imperative to move towards the left, more detail on the right edge of the display has been occluded using updated pointed shadow 615B. Note that the occlusion 615A, 615B may animated in some embodiments, pulsing in manner to reinforce a left movement.

Figure 7:
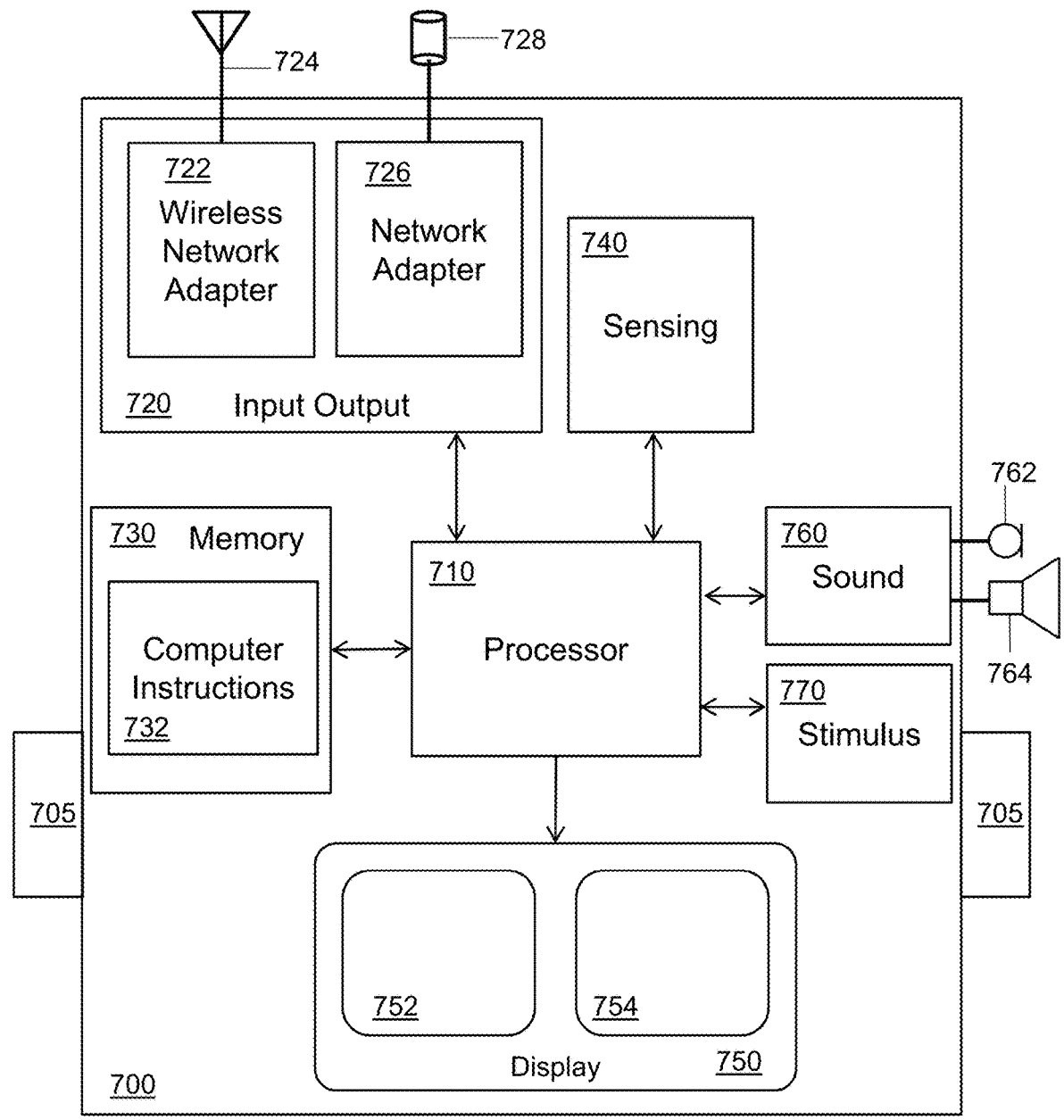
FIG. 7 shows a block diagram of an embodiment of an hybrid-reality system.

FIG. 7 is a block diagram of an embodiment of an HR system 700 which may have some components implemented as part of a head-mounted assembly. The HR system 700 may be considered a computer system that can be adapted to be worn on the head, carried by hand, or otherwise attached to a user. In the embodiment of the HR system 700 shown, a structure 705 is included which is adapted to be worn on the head of a user. The structure 705 may include straps, a helmet, a hat, or any other type of mechanism to hold the HR system on the head of the user as an HMD.

The HR system 700 also includes a display 750. The structure 705 may position the display 750 in a field of view of the user. In some embodiments, the display 750 may be a stereoscopic display with two separate views of the FOV, such as view 752 for the user's left eye, and view 754 for the user's right eye. The two views 752, 754 may be shown as two images on a single display device or may be shown using separate display devices that are included in the display 750. In some embodiments, the display 750 may be transparent, such as in an augmented reality (AR) HMD. In systems where the display 750 is transparent, the view of the FOV of the real-world as seen through the display 750 by the user is composited with virtual objects that are shown on the display 750. The virtual objects may occlude real objects in the FOV as overlay elements and may themselves be transparent or opaque, depending on the technology used for the display 750 and the rendering of the virtual object. A virtual object, such as an overlay element, may be positioned in a virtual space (two-dimensional or three-dimensional, depending on the embodiment) to be in the same position as an associated real object in real space. Note that if the display 750 is a stereoscopic display, two different views of the overlay element may be rendered and shown in two different relative positions in the two views 752, 754, depending on the disparity as defined by the inter-ocular distance of a viewer.

In some embodiments, the HR system 700 includes one or more sensors in a sensing block 740 to sense at least a portion of the FOV of the user by gathering the appropriate information for that sensor, for example visible light for a visible light camera, from the FOV of the user. Any number of any type of sensor, including sensors described previously herein, may be included in the sensor block 740, depending on the embodiment.

The HR system 700 may also include an I/O block 720 to allow communication with external devices. The I/O block 720 may include one or both of a wireless network adapter 722 coupled to an antenna 724 and a network adapter 726 coupled to a wired connection 728. The wired connection 728 may be plugged into a portable device, for example a mobile phone, or may be a component of an umbilical system such as used in extreme environments.

In some embodiments, the HR system 700 includes a sound processor 760 which takes input from one or microphones 762. In some HR systems 700, the microphones 762 may be attached to the user. External microphones, for example attached to an autonomous drone, may send sound data samples through wireless or wired connections to I/O block 720 instead of, or in addition to, the sound data received from the microphones 762. The sound processor 760 may generate sound data which is transferred to one or more speakers 764, which are a type of sound reproduction device. The generated sound data may be analog samples or digital values. If more than one speaker 764 is used, the sound processor may generate or simulate 2D or 3D sound placement. In some HR systems 700, a first speaker may be positioned to provide sound to the left ear of the user and a second speaker may be positioned to provide sound to the right ear of the user. Together, the first speaker and the second speaker may provide binaural sound to the user.

In some embodiments, the HR system 700 includes a stimulus block 770. The stimulus block 770 is used to provide other stimuli to expand the HR system user experience. Embodiments may include numerous haptic pads attached to the user that provide a touch stimulus. Embodiments may also include other stimuli, such as, but not limited to, changing the temperature of a glove, changing the moisture level or breathability of a suit, or adding smells to a breathing system.

The HR system 700 may include a processor 710 and one or more memory devices 730, which may also be referred to as a tangible medium or a computer readable medium. The processor 710 is coupled to the display 750, the sensing block 740, the memory 730, I/O block 720, sound block 760, and stimulus block 770, and is configured to execute the instructions 732 encoded on (i.e. stored in) the memory 730. Thus, the HR system 700 may include an article of manufacture comprising a tangible medium 730, that is not a transitory propagating signal, encoding computer-readable instructions 732 that, when applied to a computer system 700, instruct the computer system 700 to perform one or more methods described herein, thereby configuring the processor 710.

While the processor 710 included in the HR system 700 may be able to perform methods described herein autonomously, in some embodiments, processing facilities outside of that provided by the processor 710 included inside of the HR system 700 may be used to perform one or more elements of methods described herein. In one non-limiting example, the processor 710 may receive information from one or more of the sensors 740 and send that information through the wireless network adapter 722 to an external processor, such as a cloud processing system or an external server. The external processor may then process the sensor information to identify an object in the FOV and send information about the object, such as its shape and location in the FOV, to the processor 710 through the wireless network adapter 722. The processor 710 may then use the geometry, appearance and location of the object in the FOV to render an overlay element and show the overlay element on the display 750.

In some embodiments, the instructions 732 may instruct the HR system 700 to establish a current user position and orientation in 3D space using at least one sensor 740 coupled to the computer system 700. The instructions 732 may further instruct the HR system 700, to receive data associated with a new body position and orientation, for example data transmitted through the wireless network adapter 722 or computed using further instructions 732. The data may be any format, including absolute or relative (delta) values. The instructions 732 may instruct the HR system 700 to compute a vector towards the new position and/or orientation using the current user position as an origin. The instructions 732 may further instruct the HR system 700 to compute a point on the vector and generate a sound using speaker 764 at that point. As the user moves, the instructions 732 may instruct the HR system 700 to iterate using a new current location and generating a sound at an updated location using speaker 764 until the current position closely matches the desired position received by the HR system 700.

In some embodiments, the instructions 732 may instruct the HR system 700 to establish a current user position and orientation in 3D space using at least one sensor 740 coupled to the computer system 700. The instructions 732 may further instruct the HR system 700, to receive data associated with a new body position and orientation, for example data transmitted through the wireless network adapter 722 or computed using further instructions 732. The data may be any format, including absolute or relative (delta) values. The instructions 732 may instruct the HR system 700 to compute a vector towards the new position and/or orientation using the current user position as an origin. The instructions 732 may further instruct the HR system 700 to compute a point on the vector and generate a sound using speaker 764 at that point. As the user moves, the instructions 732 may instruct the HR system 700 to iterate using a new current location and generating a sound at an updated location using speaker 764 until the current position closely matches the desired position received by the HR system 700. When the user is at the desired position, the instructions 732 may further instruct the HR system 700 to activate at least one predetermined sensor 740. The predetermination of sensor 740 may be established using default values, received values or computed values according to a programmed practice accessed from memory 730 by instructions 732.

In some embodiments, the instructions 732 may instruct the HR system 700 to establish a situation of a user body part in 3D space using at least one sensor 740 coupled to the computer system 700. The instructions 732 may further instruct the HR system 700, to receive data associated with a new situation for the body part, for example data transmitted through the wireless network adapter 722 or computed using further instructions 732. The data may be any format, including absolute or relative (delta) values. The instructions 732 may instruct the HR system 700 to compute a vector towards the new situation using the current user position as an origin. The instructions 732 may further instruct the HR system 700 to compute a point on the vector and generate a sound using speaker 764 to appear at that point. As the user moves, the instructions 732 may instruct the HR system 700 to iterate using a new current body part situation and generate a sound at an updated location using speaker 764 until the current body part position closely matches the desired situation received by the HR system 700. When the user is at the desired situation, the instructions 732 may further instruct the HR system 700, or the user, to activate at least one sensor coupled to sensor block 740 based on the data received.

Aspects of various embodiments are described with reference to flowchart illustrations and/or block diagrams of methods, apparatus, systems, and computer program products according to various embodiments disclosed herein. It will be understood that various blocks of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and/or block diagrams in the figures help to illustrate the architecture, functionality, and operation of possible implementations of systems, methods and computer program products of various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 8:
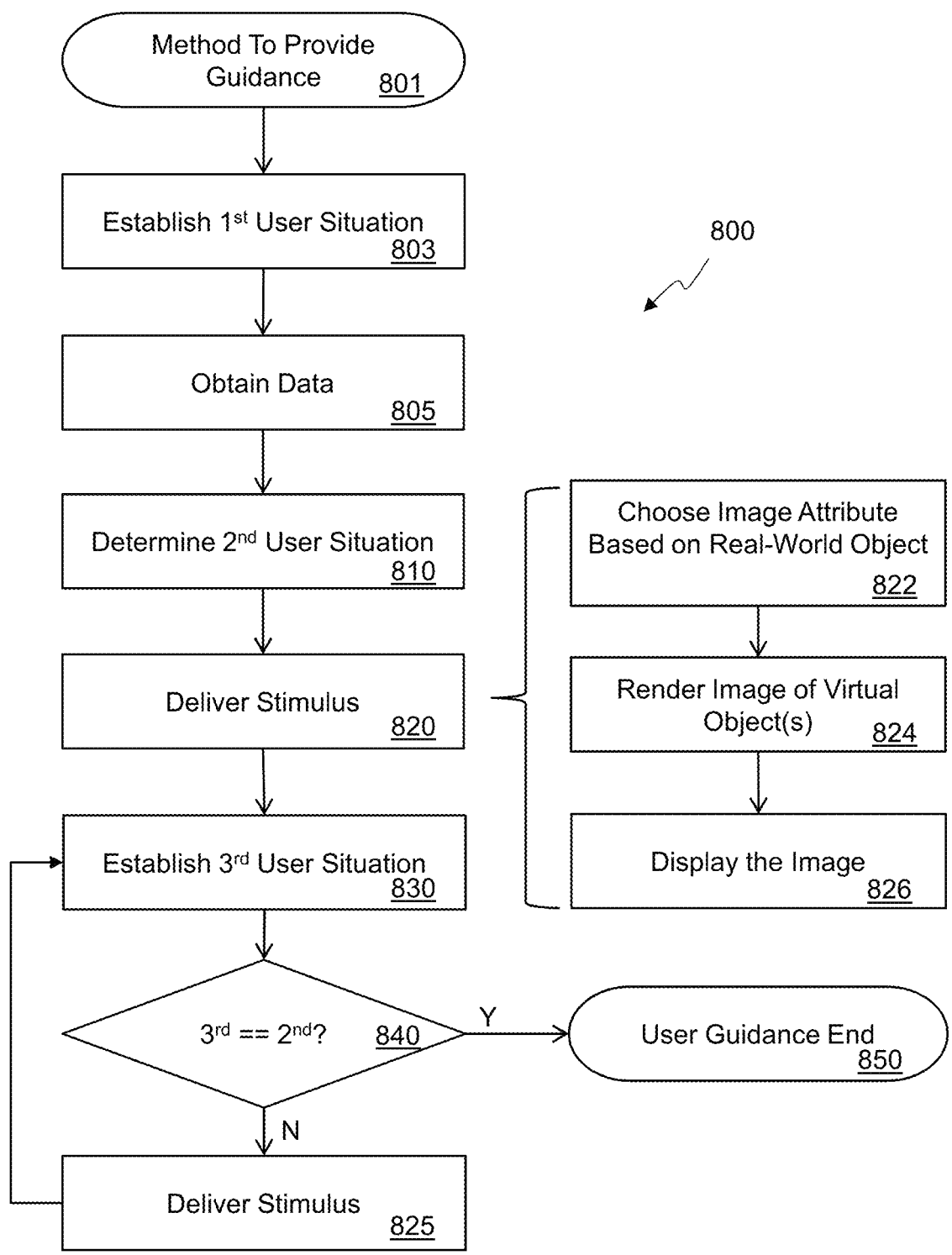
FIG. 8 is a flowchart of an embodiment of a method to provide directional guidance to a user.

FIG. 8 is a flowchart 800 of an embodiment of a method for providing 801 directional guidance, moving a user into a new position and/or orientation (i.e. a new situation) in 3D space. The method may be performed by a hybrid-reality (HR) system and may utilize a head-mounted display (HMD) worn by a user. The method starts 801 by establishing 803 a first situation of a body part of the user in three-dimensional (3D) space, for example using depth sensors in combination with object recognition. The flowchart 800 continues by obtaining data to indicating 810 a second situation of the body part in 3D space, for example using delta values received through a wireless network adapter. The body part situation may be any body part of the user in any situation, including, but not limited to, a head position, a head orientation, a hand position, a hand orientation, a foot position, or a foot orientation.

The flowchart 800 continues by delivering a stimulus 820 to prompt the user to move the body part from the first situation to the second situation. In some embodiments, a first image of one or more virtual objects is rendered 824 based on at least the second situation and the first image displayed 826 to the user to deliver the stimulus. In such embodiments, a real-world object in a field of view of the user may be selected and a virtual object of the one or more virtual objects may be rendered at a position in the first image based on a real-world position of the selected real-world object. In some embodiments, an image attribute of the rendered virtual object 822 may be based on the real-world position of the selected real-world object and the second situation. The image attribute may include, but is not limited to, a transparency, a blurriness, a brightness, or a color. The image attributed may be computed using one or more filters, such as, but not limited to, an edge filter combined with a blurring filter. Some embodiments may include determining that the selected real-world object is located away from a direction indicated by the second situation, selecting one or more background colors from the field of view of the user, creating the virtual object to occlude the real-world position of the real-world object in the field of view of the user, and shading the virtual object based on the one or more background colors.

In some embodiments a virtual object of the one or more virtual objects is rendered at a position indicated by the second situation and/or a virtual object of the one or more virtual objects represents a direction of movement from the first situation to the second situation. A virtual object of the one or more virtual objects may represent the body part and/or in some cases the virtual object may be rendered at a position in the first image to at least partially occlude a real-world position of the body part. Some embodiments may render a second image of the one or more virtual objects based on the first situation and the second situation with the second image having at least one virtual object in a different situation than in the first image. The second image may then be displayed to the user at a different time than a time that the first image is displayed to the user.

In at least one embodiment, the stimulus may be delivered 820 by rendering an animation of one or more virtual objects based on the first situation and the second situation and the animation displayed to the user. The animation may include a movement of a virtual object of the one or more virtual objects from a first position indicated by the first situation to a second position indicated by the second situation. The animation may also, or alternatively, include a changing appearance of a virtual object of the one or more virtual objects over time. The changing appearance may include a pulsating image, a spinning image, a change in brightness, or a change in color although other changes are also contemplated. An appearance of the virtual object at a particular time may based on a situation of the body part at the particular time and the second situation.

In another embodiment, the stimulus may be delivered 820 by generating a sound at a point close to a vector generated intersecting the first and second user positions. This may include calculating data for two or more channels of a sound, based on at least the second situation and a configuration of a sound system, and rendering the data for the two or more channels of the sound through the sound system to deliver the stimulus to the user. The sound system may be included in the HMD in some embodiments. In some embodiments, the data for the two or more channels of the sound may represent the sound originating from a first 3D location indicated by the second situation but in other embodiments, the data for the two or more channels of the sound may represent the sound moving from a first 3D location indicated by the first situation to a second 3D location indicated by the second situation. In some embodiments, the data for the two or more channels of the sound may be adapted to modulate the sound over time and the modulation may include a change in volume or a change in frequency. The modulation may be based on both a current situation of the body part and the second situation.

The stimulus may be delivered 820 as a haptic stimulus using a haptic transducer selected from a plurality of haptic transducers based on the first situation and the second situation. In embodiments, data may be calculated for two or more channels of haptic stimuli, based on at least the second situation and a configuration of two or more haptic transducers. The data may then be provided for the two or more channels of the haptic stimuli through the two or more haptic transducers to deliver 820 the stimulus to the user. In some cases the data for the two or more channels of the haptic stimuli may be adapted to modulate the haptic stimulus over time. The modulation may include a change in intensity or a change in frequency and/or the modulation may be based on both a current situation of the body part and the second situation.

The flowchart 800 continues by establishing 830 a third user position and orientation at a different time point in order to track user movement. This may include detecting a movement of the body part. The third position is compared 840 to the target second position, and if not close, the stimulus 825 is applied, thus changing the stimulus in response to the movement. If the comparison 840 succeeds, the user is in the desired position and so the guidance ends 850. Some embodiments may detect that no movement of the body part has occurred during a predetermined period of time and change the stimulus in response to the lack of movement during the predetermined period of time. Note that any update loop in flowchart 800 is purely notional; an interrupt-driven handler or software event handler may be used in some embodiments to save power.

Figure 9:
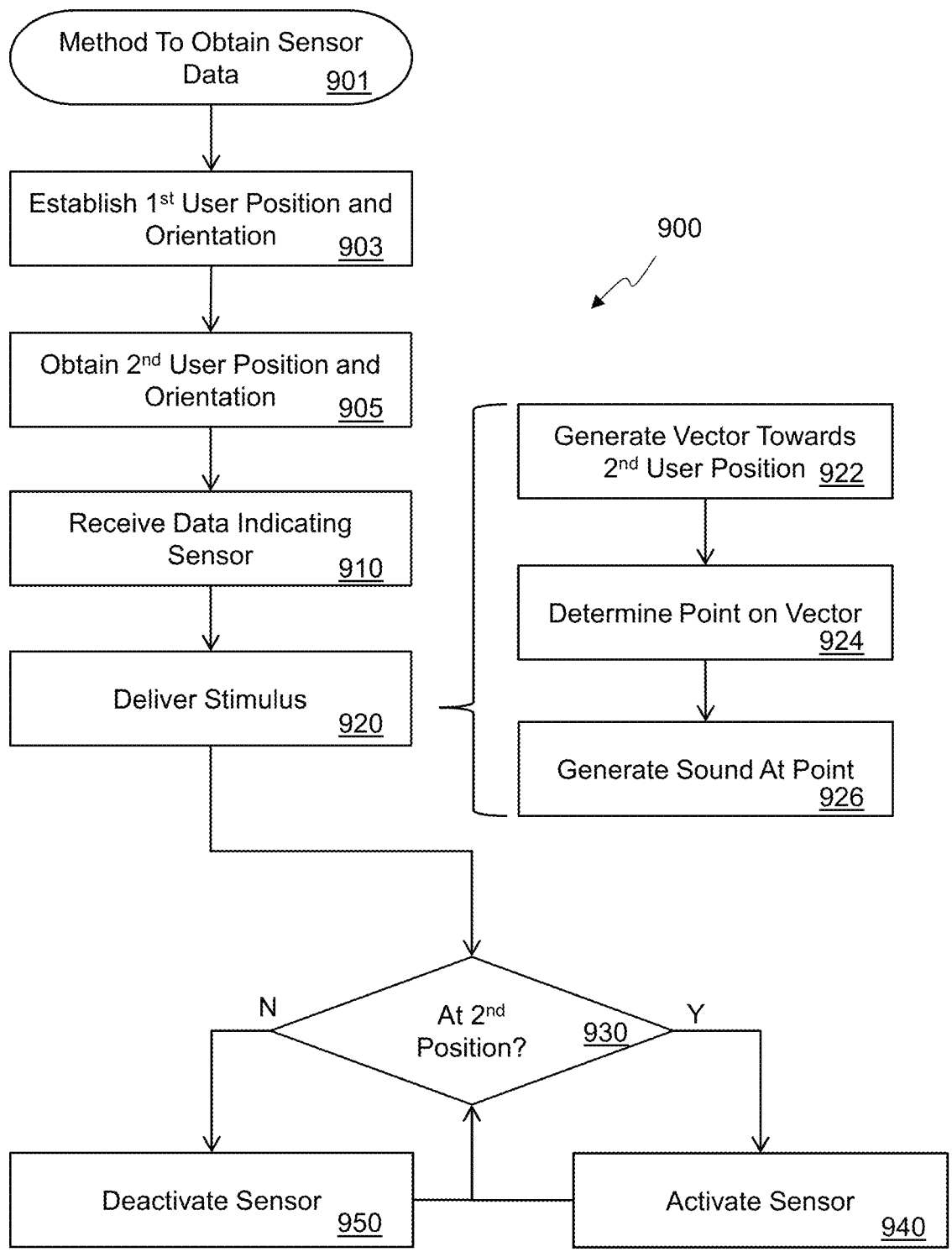
FIG. 9 is a flowchart of an embodiment of a method to activate a sensor positioned by a user wearing a head-mounted display.

FIG. 9 is a flowchart 900 of an embodiment of a method for obtaining 901 sensor data at a specified location in 3D space, for example pointing a camera in between occluding objects. The method may be performed by a hybrid-reality (HR) system and may utilize a head-mounted display (HMD) worn by a user. The method starts by establishing 903 a first user position and orientation, for example using depth sensors in combination with object recognition. The flowchart 900 continues by obtaining data to determine a second user position and orientation 905, for example using delta values received through a wireless network adapter. Data is received 910 that indicates a sensor to be activated at the second situation of the body part. The flowchart 900 continues by delivering a stimulus 920 to prompt the user to move the body part from the first situation to the second situation. The body part situation may be any body part of the user in any situation, including, but not limited to, a head position, a head orientation, a hand position, a hand orientation, a foot position, or a foot orientation.

The stimulus may be delivered 920 by generating a sound at a point close to a vector generated intersecting the first and second user positions. A sound 926 may be generated to appear to originate at a point 924 close to a vector generated 922 intersecting the first and second user positions. This may include calculating data for two or more channels of a sound, based on at least the second situation and a configuration of a sound system, and rendering the data for the two or more channels of the sound through the sound system to deliver the stimulus to the user. The sound system may be included in the HMD in some embodiments. In some embodiments, the data for the two or more channels of the sound may represent the sound originating from a first 3D location indicated by the second situation but in other embodiments, the data for the two or more channels of the sound may represent the sound moving from a first 3D location indicated by the first situation to a second 3D location indicated by the second situation. In some embodiments, the data for the two or more channels of the sound may be adapted to modulate the sound over time and the modulation may include a change in volume or a change in frequency. The modulation may be based on both a current situation of the body part and the second situation.

In other embodiments, the stimulus may be delivered 920 by rendering a first image of one or more virtual objects on a display visible to the user based on at least the second situation to deliver the stimulus, or rendering an animation of one or more virtual objects on a display visible to the user based on the first situation and the second situation to deliver the stimulus. In at least one embodiment, the stimulus includes a haptic stimulus delivered by a haptic transducer selected from a plurality of haptic transducers based on the first situation and the second situation.

The flowchart 900 continues by detecting that the body part is at or near the second situation 930 and activating the sensor 940 in response to said detecting that the body part is at or near the second situation. If the body part is no longer at or near the second situation, the flowchart 900 includes deactivating the sensor 950. In some embodiments, the sensor may be deactivated after a first period of time even if the body part is still at or near the second situation. Data may be received indicating a minimum value for the first period of time or a maximum value for the first period of time. In other embodiments, the first period of time may be predetermined.

In some embodiments, a third situation of the body part in 3D space may be obtained based on the data from the sensor and a second stimulus delivered to prompt the user to move the body part from the second situation to the third situation. The data may be received from the sensor and in some embodiments, the sensor may be coupled to the body part. The third situation may be received from a remote computer.

Some embodiments may also include instructing the user to place the sensor on a real-world object proximal to the second situation of the body part. In such embodiments, the instructing may include rendering a virtual object overlaid on an image of the real-world object on a display visible to the user, rendering text on a display visible to the user, providing audio instructions to the user, or any combination thereof.

In some embodiments multiple haptic transducers may be included on a haptic device and different messages may be delivered to a user by using applying a stimulus from different sets of those haptic transducers. The haptic device may be included as a part of the HR system, may be an accessory to the HR system, or may be operated independently from the HR system, depending on the embodiment. For example, a glove may be provided with a three haptic transducers (e.g., point A, point B, and point C on the hand of the user wearing the glove) and those haptic transducers may be used to apply vibrations simultaneously, independently, consecutively, or gradually. Depending on the timing of vibrations of each haptic transducer, and how many haptic transducers vibrate at the same time or consecutively, different messages can be delivered to a user.

FIG. 10A shows one embodiment where different combinations of vibrations from the three haptic transducers can be used to deliver more than three messages to the user. Some of the messages may be related to the directed movement of the user, but other messages may be separate or in addition to the directed movement. In at least one embodiment, points A, B and C vibrating at the same time indicates that the user should stop what they are doing and await further instructions. If points B and C vibrate simultaneously, but point A does not, the user is being asked to check their status (e.g., check monitor or other devices). The vibration of a single point, such as point B or point C may be used to direct movement of the user as described above.

In addition, delivered messages may be changed depending on the current context of the user. FIG. 10B shows an embodiment of messages to be sent to a user who is not currently in motion, or is in a stand-by mode, as opposed to the messages shown in FIG. 10A which are directed to a user while they are in motion. While the user is in the stand-by mode, if all three points vibrate, the user is being told to initiate motion and move forward, if only points B and C vibrate, the user is being informed that they should check their status. Vibration of point B alone may indicate that the user should look at, or inspect an object in their field of view and vibration of point C along may indicate that the user should call their supervisor. The user may be trained in advance in how to interpret combinations of stimuli and any type of message may be indicated by any combination of stimuli In other embodiments, haptic transducer stimuli may have different characteristics which may be used to signal any type of message to the user, including, but not limited to directing a movement of the user. The characteristics of the haptic transducer stimuli may include a strength of a stimulus, a frequency of the stimulus, a duration of the stimulus, a pattern of stimuli between multiple transducers, or any other characteristic of the stimuli. In some embodiments, a change in the frequency of the stimulus or pulses of stimuli may be used to impart a degree of urgency or other aspect of the message being delivered. For instance, when the frequency of vibration is high, it may mean that the urgency of the message is high, and when the haptic transducers vibrate 3 times, it may mean that the user needs to conduct a predetermined action.

In some embodiments, a haptic stimulus may be combined with one or more other stimuli, such as sound or visual stimuli, to deliver more detailed message. As a non-limiting example, providing a haptic stimulus simultaneously with yellow flashing light may be used to indicate that the directed movement is urgent, while if the same stimulus is provided simultaneously with a blue light, no added urgency is indicated. In another example, one or more haptic stimuli may be used to deliver a message, at the same time that a visual indicator of the message displayed to the user to confirm the meaning of the haptic stimuli.

As will be appreciated by those of ordinary skill in the art, aspects of the various embodiments may be embodied as a system, device, method, or computer program product apparatus. Accordingly, elements of the present disclosure may take the form of an entirely hardware embodiment, an entirely software embodiment (including firmware, resident software, micro-code, or the like) or an embodiment combining software and hardware aspects that may all generally be referred to herein as a "server," "circuit," "module," "client," "computer," "logic," or "system," or other terms. Furthermore, aspects of the various embodiments may take the form of a computer program product embodied in one or more computer-readable medium(s) having computer program code stored thereon.

Any combination of one or more computer-readable storage medium(s) may be utilized. A computer-readable storage medium may be embodied as, for example, an electronic, magnetic, optical, electromagnetic, infrared, or semiconductor system, apparatus, or device, or other like storage devices known to those of ordinary skill in the art, or any suitable combination of computer-readable storage mediums described herein. In the context of this document, a computer-readable storage medium may be any tangible medium that can contain, or store a program and/or data for use by or in connection with an instruction execution system, apparatus, or device. Even if the data in the computer-readable storage medium requires action to maintain the storage of data, such as in a traditional semiconductor-based dynamic random access memory, the data storage in a computer-readable storage medium can be considered to be non-transitory. A computer data transmission medium, such as a transmission line, a coaxial cable, a radio-frequency carrier, and the like, may also be able to store data, although any data storage in a data transmission medium can be said to be transitory storage. Nonetheless, a computer-readable storage medium, as the term is used herein, does not include a computer data transmission medium.

Computer program code for carrying out operations for aspects of various embodiments may be written in any combination of one or more programming languages, including object oriented programming languages such as Java, Python, C++, or the like, conventional procedural programming languages, such as the "C" programming language or similar programming languages, or low-level computer languages, such as assembly language or microcode. The computer program code if loaded onto a computer, or other programmable apparatus, produces a computer implemented method. The instructions which execute on the computer or other programmable apparatus may provide the mechanism for implementing some or all of the functions/acts specified in the flowchart and/or block diagram block or blocks. In accordance with various implementations, the program code may execute entirely on the user's computer, partly on the user's computer, as a stand-alone software package, partly on the user's computer and partly on a remote computer or entirely on the remote computer or server, such as a cloud-based server. In the latter scenario, the remote computer may be connected to the user's computer through any type of network, including a local area network (LAN) or a wide area network (WAN), or the connection may be made to an external computer (for example, through the Internet using an Internet Service Provider). The computer program code stored in/on (i.e. embodied therewith) the non-transitory computer-readable medium produces an article of manufacture.

The computer program code, if executed by a processor causes physical changes in the electronic devices of the processor which change the physical flow of electrons through the devices. This alters the connections between devices which changes the functionality of the circuit. For example, if two transistors in a processor are wired to perform a multiplexing operation under control of the computer program code, if a first computer instruction is executed, electrons from a first source flow through the first transistor to a destination, but if a different computer instruction is executed, electrons from the first source are blocked from reaching the destination, but electrons from a second source are allowed to flow through the second transistor to the destination. So a processor programmed to perform a task is transformed from what the processor was before being programmed to perform that task, much like a physical plumbing system with different valves can be controlled to change the physical flow of a fluid.

Some examples of embodiments are listed below:

Embodiment 1

A method to provide directional guidance to a user, the method comprising: establishing a first situation of a body part of the user in three-dimensional (3D) space; obtaining data indicating a second situation of the body part in 3D space; and delivering a stimulus to prompt the user to move the body part from the first situation to the second situation.

Embodiment 2

The method of embodiment 1, the stimulus delivered to the user through a head-mounted display worn by the user.

Embodiment 3

The method of embodiment 1, the second situation comprising a head position, a head orientation, a hand position, a hand orientation, a foot position, or a foot orientation.

Embodiment 4

The method of embodiment 1, further comprising: detecting a movement of the body part; and changing the stimulus in response to the movement.

Embodiment 5

The method of embodiment 1, further comprising: detecting that no movement of the body part has occurred during a predetermined period of time; and changing the stimulus in response to the lack of movement during the predetermined period of time.

Embodiment 6

The method of embodiment 1, further comprising: rendering a first image of one or more virtual objects based on at least the second situation; and displaying the first image to the user to deliver the stimulus.

Embodiment 7

The method of embodiment 6, further comprising: selecting a real-world object in a field of view of the user; and rendering a virtual object of the one or more virtual objects at a position in the first image based on a real-world position of the selected real-world object, wherein an image attribute of the rendered virtual object is based on the real-world position of the selected real-world object and the second situation.

Embodiment 8

The method of embodiment 7, the image attribute comprising a transparency, a blurriness, a brightness, or a color.

Embodiment 9

The method of embodiment 7, the image attribute computed using one or more filters.

Embodiment 10

The method of embodiment 7, the image attribute computed using an edge filter combined with a blurring filter.

Embodiment 11

The method of embodiment 7, further comprising: determining that the selected real-world object is located away from a direction indicated by the second situation; selecting one or more background colors from the field of view of the user; creating the virtual object to occlude the real-world position of the real-world object in the field of view of the user; and shading the virtual object based on the one or more background colors.

Embodiment 12

The method of embodiment 6, the rendering comprising rendering a virtual object of the one or more virtual objects at a position indicated by the second situation.

Embodiment 13

The method of embodiment 6, a virtual object of the one or more virtual objects representing a direction of movement from the first situation to the second situation.

Embodiment 14

The method of embodiment 6, a virtual object of the one or more virtual objects representing the body part.

Embodiment 15

The method of embodiment 14, the virtual object rendered at a position in the first image to at least partially occlude a real-world position of the body part.

Embodiment 16

The method of embodiment 6, further comprising: rendering a second image of the one or more virtual objects based on the first situation and the second situation, the second image having at least one virtual object in a different situation than in the first image; and displaying the second image to the user at a different time than a time that the first image is displayed to the user.

Embodiment 17

The method of embodiment 1, further comprising: rendering an animation of one or more virtual objects based on the first situation and the second situation; and displaying the animation to the user to deliver the stimulus.

Embodiment 18

The method of embodiment 17, the animation comprising a movement of a virtual object of the one or more virtual objects from a first position indicated by the first situation to a second position indicated by the second situation.

Embodiment 19

The method of embodiment 17, the animation comprising a changing appearance of a virtual object of the one or more virtual objects over time.

Embodiment 20

The method of embodiment 19, the changing appearance comprising a pulsating image, a spinning image, a change in brightness, or a change in color.

Embodiment 21

The method of embodiment 19, wherein an appearance of the virtual object at a particular time is based on a situation of the body part at the particular time and the second situation.

Embodiment 22

The method of embodiment 1, further comprising: calculating data for two or more channels of a sound, based on at least the second situation and a configuration of a sound system; and rendering the data for the two or more channels of the sound through the sound system to deliver the stimulus to the user.

Embodiment 23

The method of embodiment 22, the data for the two or more channels of the sound representing the sound originating from a first 3D location indicated by the second situation.

Embodiment 24

The method of embodiment 22, the data for the two or more channels of the sound representing the sound moving from a first 3D location indicated by the first situation to a second 3D location indicated by the second situation.

Embodiment 25

The method of embodiment 22, the data for the two or more channels of the sound adapted to modulate the sound over time.

Embodiment 26

The method of embodiment 25, the modulation comprising a change in volume or a change in frequency.

Embodiment 27

The method of embodiment 25, the modulation based on both a current situation of the body part and the second situation.

Embodiment 28

The method of embodiment 1, the stimulus comprising a haptic stimulus delivered by a haptic transducer selected from a plurality of haptic transducers based on the first situation and the second situation.

Embodiment 29

The method of embodiment 1, further comprising: calculating data for two or more channels of haptic stimuli, based on at least the second situation and a configuration of two or more haptic transducers; and providing the data for the two or more channels of the haptic stimuli through the two or more haptic transducers to deliver the stimulus to the user.

Embodiment 30

The method of embodiment 29, the data for the two or more channels of the haptic stimuli adapted to modulate the haptic stimulus over time.

Embodiment 31

The method of embodiment 29, the modulation comprising a change in intensity or a change in frequency.

Embodiment 32

The method of embodiment 29, the modulation based on both a current situation of the body part and the second situation.

Embodiment 33

An article of manufacture comprising a tangible medium, that is not a transitory propagating signal, encoding computer-readable instructions that, when applied to a computer system, instruct the computer system to perform a method comprising: establishing a first situation of a body part of the user in three-dimensional (3D) space; obtaining data indicating a second situation of the body part in 3D space; and delivering a stimulus to prompt the user to move the body part from the first situation to the second situation.

Embodiment 34

A head-mounted display (HMD) comprising: a display; a structure, coupled to the display and adapted to position the display in a field-of-view (FOV) of the user; and a processor, coupled to the display and the sound reproduction device, the processor configured to: establish a first situation of a body part of the user in three-dimensional (3D) space; obtain data indicating a second situation of the body part in 3D space; and deliver a stimulus to prompt the user to move the body part from the first situation to the second situation.

Embodiment 35

A method to obtain sensor data, the method comprising: establishing a first situation of a body part of the user in three-dimensional (3D) space; obtaining data indicating a second situation of the body part in 3D space; and receiving data indicating a sensor to be activated at the second situation of the body part; and delivering a stimulus to prompt the user to move the body part from the first situation to the second situation.

Embodiment 36

The method of embodiment 35, the stimulus delivered to the user through a head-mounted display worn by the user.

Embodiment 37

The method of embodiment 35, the second situation comprising a head position, a head orientation, a hand position, a hand orientation, a body position, a body orientation, a foot position, or a foot orientation.

Embodiment 38

The method of embodiment 35, further comprising: detecting that the body part is at or near the second situation; and activating the sensor in response to said detecting that the body part is at or near the second situation.

Embodiment 39

The method of embodiment 38, further comprising: detecting that the body part is no longer at or near the second situation; and deactivating the sensor in response to said detecting that the body part is no longer at or near the second situation.

Embodiment 40

The method of embodiment 38, further comprising: deactivating the sensor after a first period of time.

Embodiment 41

The method of embodiment 40, further comprising: receiving data indicating a minimum value for the first period of time.

Embodiment 42

The method of embodiment 40, further comprising: receiving data indicating a maximum value for the first period of time.

Embodiment 43

The method of embodiment 40, wherein the first period of time is predetermined.

Embodiment 44

The method of embodiment 38, further comprising: obtaining a third situation of the body part in 3D space based on the data from the sensor; and delivering a second stimulus to prompt the user to move the body part from the second situation to the third situation.

Embodiment 45

The method of embodiment 44, further comprising: receiving data from the sensor, wherein the sensor is coupled to the body part.

Embodiment 46

The method of embodiment 44, further comprising: receiving the third situation from a remote computer.

Embodiment 47

The method of embodiment 35, further comprising: instructing the user to place the sensor on a real-world object proximal to the second situation of the body part.

Embodiment 48

The method of embodiment 47, the instructing comprising rendering a virtual object overlaid on an image of the real-world object on a display visible to the user.

Embodiment 49

The method of embodiment 47, the instructing comprising rendering text on a display visible to the user.

Embodiment 50

The method of embodiment 47, the instructing comprising providing audio instructions to the user.

Embodiment 51

The method of embodiment 35, further comprising: rendering a first image of one or more virtual objects on a display visible to the user based on at least the second situation to deliver the stimulus.

Embodiment 52

The method of embodiment 35, further comprising: rendering an animation of one or more virtual objects on a display visible to the user based on the first situation and the second situation to deliver the stimulus.

Embodiment 53

The method of embodiment 35, further comprising: calculating data for two or more channels of a sound, based on at least the second situation and a configuration of a sound system; and rendering the data for the two or more channels of the sound through the sound system to deliver the stimulus to the user.

Embodiment 54

The method of embodiment 35, the stimulus comprising a haptic stimulus delivered by a haptic transducer selected from a plurality of haptic transducers based on the first situation and the second situation.

Embodiment 55

An article of manufacture comprising a tangible medium, that is not a transitory propagating signal, encoding computer-readable instructions that, when applied to a computer system, instruct the computer system to perform a method comprising: establishing a first situation of a body part of the user in three-dimensional (3D) space; obtaining data indicating a second situation of the body part in 3D space; and receiving data indicating a sensor to be activated at the second situation of the body part; and delivering a stimulus to prompt the user to move the body part from the first situation to the second situation.

Embodiment 56

A head-mounted display (HMD) comprising: a display; a structure, coupled to the display and adapted to position the display in a field-of-view (FOV) of the user; a processor, coupled to the display and the sound reproduction device, the processor configured to: establish a first situation of a body part of the user in three-dimensional (3D) space; obtain data indicating a second situation of the body part in 3D space; and receive data indicating a sensor to be activated at the second situation of the body part; and deliver a stimulus to prompt the user to move the body part from the first situation to the second situation.

Embodiment 57

The method of embodiment 1, further comprising determining a message for delivery to the user; calculating data for two or more channels of haptic stimuli, based on the message and a configuration of two or more haptic transducers; and providing the data for the two or more channels of the haptic stimuli through the two or more haptic transducers to deliver a second stimulus to the user, the second stimulus based on the message.

Unless otherwise indicated, all numbers expressing quantities, properties, measurements, and so forth, used in the specification and claims are to be understood as being modified in all instances by the term "about." The recitation of numerical ranges by endpoints includes all numbers subsumed within that range, including the endpoints (e.g. 1 to 5 includes 1, 2.78, π, 3.33, 4, and 5).

As used in this specification and the appended claims, the singular forms "a", "an", and "the" include plural referents unless the content clearly dictates otherwise. Furthermore, as used in this specification and the appended claims, the term "or" is generally employed in its sense including "and/or" unless the content clearly dictates otherwise. As used herein, the term "coupled" includes direct and indirect connections. Moreover, where first and second devices are coupled, intervening devices including active devices may be located there between.

The description of the various embodiments provided above is illustrative in nature and is not intended to limit this disclosure, its application, or uses. Thus, different variations beyond those described herein are intended to be within the scope of embodiments. Such variations are not to be regarded as a departure from the intended scope of this disclosure. As such, the breadth and scope of the present disclosure should not be limited by the above-described exemplary embodiments, but should be defined only in accordance with the following claims and equivalents thereof.

What is claimed is:

1. A method to obtain particular sensor data from a sensor by guiding a user, the method comprising:
    establishing a current situation of a body part of the user in three-dimensional (3D) space, the sensor coupled to the body part to move with the body part and configured to provide data about a real-world object other than the user, wherein the sensor is unable to provide the particular sensor data with the body part in the current situation;
    obtaining data indicating a proposed situation of the body part in 3D space to position the sensor to obtain the particular sensor data;
    delivering a stimulus, based on the data indicating the proposed situation of the body part, to guide the user to move the body part from the current situation to the proposed situation;
    detecting that the body part is at or near the proposed situation; and
    obtaining the particular sensor data about the real-world object from the sensor in response to said detecting that the body part is at or near the proposed situation.

2. The method of claim 1, wherein:
the stimulus comprises an image of a virtual object delivered to the user through a head-mounted display worn by the user;
the sensor comprises an image sensor attached to the head-mounted display;
the body part comprises a head of the user; and
the particular sensor data comprises an image of an area hidden from the image sensor by an occluding object when the head of the user is in the current situation, the area including the real-world object.

3. The method of claim 1, the proposed situation comprising a head position, a head orientation, a hand position, a hand orientation, a body position, a body orientation, a foot position, or a foot orientation.

4. The method of claim 1, further comprising:
detecting that the body part is no longer at or near the proposed situation; and
halting said obtaining of the particular sensor data in response to said detecting that the body part is no longer at or near the proposed situation.

5. The method of claim 1, further comprising:
rendering an image of one or more virtual objects on a display visible to the user based on at least the proposed situation to deliver the stimulus.

6. The method of claim 1, further comprising:
calculating data for two or more channels of audio to represent a sound emanating from a particular position in 3D space, the particular position based on at least the proposed situation and a configuration of a sound system used to deliver the two or more channels of audio to the user; and
rendering the data for the two or more channels of the audio through the sound system to deliver the stimulus to the user.

7. The method of claim 1, the stimulus comprising a haptic stimulus delivered by a haptic transducer selected from a plurality of haptic transducers based on the current situation and the proposed situation.

8. An article of manufacture comprising a tangible medium, that is not a transitory propagating signal, encoding computer-readable instructions that, when applied to a computer system, instruct the computer system to perform a method to obtain particular sensor data from a sensor by guiding a user, the method comprising:
establishing a current situation of a body part of the user in three-dimensional (3D) space, the sensor coupled to the body part to move with the body part and configured to provide data about a real-world object other than the user, wherein the sensor is unable to provide the particular sensor data with the body part in the current situation;
obtaining data indicating a proposed situation of the body part in 3D space to position the sensor to obtain the particular sensor data;
delivering a stimulus, based on the data indicating the proposed situation of the body part, to guide the user to move the body part from the current situation to the proposed situation;
detecting that the body part is at or near the proposed situation; and
obtaining the particular sensor data about the real-world object from the sensor in response to said detecting that the body part is at or near the proposed situation.

9. A head-mounted display (HMD) comprising:
a display;
a sensor configured to provide data about a real-world object other than a user wearing the HMD;
a structure, coupled to the display and the sensor and adapted to position the display in a field-of-view (FOV) of the user;
a processor, coupled to the display and the sensor, the processor configured to:
establish a current situation of a head of the user in three-dimensional (3D) space, wherein the sensor is unable to provide the particular sensor data with the head of the user in the current situation;
obtain data indicating a proposed situation of the head of the user in 3D space to position the sensor to obtain particular sensor data;
deliver a stimulus, based on the data indicating the proposed situation of the head of the user, to guide the user to move the head of the user from the current situation to the proposed situation;
detect that the head of the user is at or near the proposed situation; and
obtain the particular sensor data about the real-world object from the sensor in response to said detection of the head of the user is at or near the proposed situation.

10. The HMD of claim 9, the processor further configured to:
render an image of one or more virtual objects on the HMD based on at least the proposed situation to deliver the stimulus.

11. The HMD of claim 10, wherein the image provides directional guidance to the user to place the HMD in a location that allows the sensor to obtain the particular sensor data.

12. The HMD of claim 11, wherein the particular sensor data comprises an image of an area which includes the real-world object and is hidden from the image sensor by an occluding object when the head of the user is in the current situation.

13. The article of manufacture of claim 8, the method further comprising:
rendering an image of one or more virtual objects on a display visible to the user based on at least the proposed situation to deliver the stimulus.

14. The article of manufacture of claim 13, wherein the one or more virtual objects comprise a virtual image of the body part positioned in the proposed situation.

15. The article of manufacture of claim 8, the method further comprising:
calculating data for two or more channels of audio to represent a sound emanating from a particular position in 3D space, the particular position based on at least the proposed situation and a configuration of a sound system used to deliver the two or more channels of audio to the user; and
rendering the data for the two or more channels of the audio through the sound system to deliver the stimulus to the user.

16. The article of manufacture of claim 8, the stimulus comprising a haptic stimulus delivered by a haptic transducer selected from a plurality of haptic transducers based on the current situation and the proposed situation.

17. The method of claim 1, wherein the sensor is attached to a head-mounted display worn by the user and the body part is the head of the user.

18. The method of claim 5, wherein the one or more virtual objects comprise a virtual image of the body part positioned in the proposed situation.

19. The method of claim 5, wherein the image provides directional guidance to the user to place the user in a location that allows the body part to be in the proposed situation so that the sensor is able to obtain the particular sensor data.

20. The method of claim 1, further comprising
   rendering an animation of a virtual image of the body part moving from the current situation to the proposed situation on a display visible to the user to deliver the stimulus.

\* \* \* \* \*